United States Patent
Coulmeau et al.

(10) Patent No.: US 10,154,096 B2
(45) Date of Patent: Dec. 11, 2018

(54) METHOD FOR INTEGRATING A NEW SERVICE INTO AN AVIONICS ONBOARD SYSTEM WITH OPEN ARCHITECTURE OF CLIENT-SERVER TYPE, IN PARTICULAR FOR AN FIM MANOEUVRE SERVICE

(71) Applicant: THALES, Courbevoie (FR)

(72) Inventors: François Coulmeau, Toulouse (FR); Laurent Deweerdt, Toulouse (FR)

(73) Assignee: THALES, Courbevoie (FR)

( * ) Notice: Subject to any disclaimer, the term of this patent is extended or adjusted under 35 U.S.C. 154(b) by 237 days.

(21) Appl. No.: 15/202,509

(22) Filed: Jul. 5, 2016

(65) Prior Publication Data
US 2017/0013061 A1    Jan. 12, 2017

(30) Foreign Application Priority Data

Jul. 7, 2015  (FR) ...................................... 15 01440

(51) Int. Cl.
*G06F 8/36*   (2018.01)
*H04L 29/08*  (2006.01)
(Continued)

(52) U.S. Cl.
CPC ............ *H04L 67/125* (2013.01); *B64D 47/00* (2013.01); *G01C 21/00* (2013.01); *G06F 8/36* (2013.01); *G06F 8/60* (2013.01); *G06F 9/5061* (2013.01); *G08G 5/0008* (2013.01); *G08G 5/0013* (2013.01); *G08G 5/0021* (2013.01);
(Continued)

(58) Field of Classification Search
CPC ....... H04L 67/125; H04L 67/34; H04L 67/42; H04L 41/02; B64D 47/00; G01C 21/00; G06F 8/36; G06F 8/60; G06F 9/5061; G06Q 30/0206
See application file for complete search history.

(56) References Cited

U.S. PATENT DOCUMENTS 6,317,659 B1 *  11/2001  Lindsley ................... G06F 8/20
                                                          244/175
2007/0234282 A1  10/2007  Prigge et al.
(Continued)

FOREIGN PATENT DOCUMENTS

FR       3 013 880 A1      5/2015
FR       3 021 108 A1     11/2015
WO   WO-2011012156 A1 *   2/2011   ............. G01C 21/00

OTHER PUBLICATIONS

Debardelaben et al., "Incorporating Cost Modeling in Embedded-System Design," IEEE Design & Test of Computers, vol. 14, No. 3, Jul. 1, 1997, pp. 24-35, XP000783300.

*Primary Examiner* — Viet D Vu
(74) *Attorney, Agent, or Firm* — Baker & Hostetler LLP

(57) ABSTRACT

A method for integrating a new navigation service is implemented in an avionics onboard system comprising a DAL+ core computer and a DAL– peripheral computer for managing the application. The method of integration determines an optimal functional and physical distribution of the elementary functions FU(i) of the new service within the onboard avionics system over the set of possible distributions which minimizes a global cost criterion CG, dependent on several parameters, including at least the additional development cost of the elementary functions integrated within the digital DAL+ core computer, and carries out the integration of the new service.

19 Claims, 7 Drawing Sheets

(51) Int. Cl.
*G06F 8/60* (2018.01)
*G06F 9/50* (2006.01)
*B64D 47/00* (2006.01)
*G01C 21/00* (2006.01)
*H04L 12/24* (2006.01)
*H04L 29/06* (2006.01)
*G08G 5/00* (2006.01)
*G08G 5/04* (2006.01)
*G06Q 30/02* (2012.01)

(52) U.S. Cl.
CPC ......... *G08G 5/0052* (2013.01); *G08G 5/0078* (2013.01); *G08G 5/045* (2013.01); *H04L 41/02* (2013.01); *H04L 67/34* (2013.01); *H04L 67/42* (2013.01); *G06Q 30/0206* (2013.01)

(56) References Cited

U.S. PATENT DOCUMENTS

| | | | | |
|---|---|---|---|---|
| 2009/0198392 A1* | 8/2009 | Eicke | ................... | G01C 23/005 701/3 |
| 2012/0278464 A1* | 11/2012 | Lehane | ............... | H04L 12/1407 709/223 |
| 2015/0150095 A1 | 5/2015 | Mere et al. | | |

\* cited by examiner

METHOD FOR INTEGRATING A NEW SERVICE INTO AN AVIONICS ONBOARD SYSTEM WITH OPEN ARCHITECTURE OF CLIENT-SERVER TYPE, IN PARTICULAR FOR AN FIM MANOEUVRE SERVICE

CROSS-REFERENCE TO RELATED APPLICATION

This application claims priority to foreign French patent application No. FR 1501440, filed on Jul. 7, 2015, the disclosures of which are incorporated by reference in their entirety.

FIELD OF THE INVENTION

The present invention relates to a method for integrating a new navigation service or application into an avionics onboard system with open architecture of client-server type.

The present invention also relates to the integration architecture of the onboard avionics system with open architecture integrating the new service.

The present invention relates in particular to a method for integrating an FIM (Flight Interval Management) manoeuvre service for the relative spacing between aircraft into an avionics onboard system with open architecture of client-server type, as well as the implementation of the FIM service by the integrating onboard avionics system.

BACKGROUND

The invention lies in the field of onboard systems, and more particularly that of avionics systems which implement a navigation computer, such as the Flight Management System FMS.

In a conventional manner, each real-time avionics system is architectured and developed so as to meet performance requirements in terms in particular of failure rate (reset) and functional Quality of Service (QoS), in a defined framework of use.

Onboard avionics systems are qualified, with a demonstrated performance level, for a given environment and have different levels of software development, that are more or less expensive, corresponding to different safety or criticality requirements. Indeed, these levels of software development arise from the aircraft risk analysis FHA (Functional Hazard Analysis), termed "operating dependability analysis", according to the international standards RTCA DO178C (USA) or ED-12C (European equivalent of EUROCAE). This risk analysis establishes the contribution of each function in the aircraft's operational chain so as to determine which maximum failure level must be reached. In order to achieve the objective in question, the standard constrains the required quality of the hardware and software in which the function is embedded and which implements it. These development quality levels are called "DALs" (Development Assurance Levels).

Current avionics architectures are the result of a history, in which economic considerations have played a significant role. Thus, for reasons to do with "certification credit" or incremental qualification, and also for reasons to do with wiring costs relating to the interfaces, the new navigation functions have been systematically integrated within a single computer, namely either the flight management system FMS, the taxiing system TAXI or the Automatic Pilot PA.

Likewise, monitoring functions are systematically integrated within a single computer, depending on what is monitored: TCAS (Traffic Collision Avoidance System), TAWS (Terrain Awareness and Warning System), WMS (Weather Management System), the CMU (airspace-related constraints), the EFB (operational constraints of the company).

Likewise, the monitoring of the aircraft states is centralized in computers of FWS (Flight Warning Systems) and OMS (Onboard Maintenance Systems) type.

Currently, the automatic pilot PA is developed in level DAL A which corresponds to the highest criticality level, and the FMS is, depending on the aircraft, developed in level DAL B or C, with a trend to switch to DAL development level B in view of its increasing use in procedures. The TCAS for its part is developed in level DAL C or DAL D, and acts as a safeguarding device, it not being used to guide the craft but to forewarn of danger when the other systems have failed.

Now, for iso-functional, that is to say for one and the same operationally rendered service, it may be estimated that each change of DAL development level multiplies the development cost tenfold. Indeed, when the software development level increases from D to A via C and B, the safety requirement increases, this being manifested by an increase in the complexity of the algorithm and its degree of validation.

Thus, a visual aid function for navigation, whose risk analysis FHA requires a level D, is currently integrated into one of the existing computers, FMS or PA, of level A to C, thus giving rise to a development cost that is ten to a hundred times greater than it would be in a level D hardware environment.

On top of this development cost, the insertion of new functions or services into an existing architecture frequently leads to complex solutions between the systems, which generate a training load for crews and maintenance teams, and increases the risk of error when operating the equipment in order to carry out the function.

Solutions are currently proposed in a first French patent application published under the number FR3013880 and a second French patent application filed on 16 May 2014 and registered under the filing number 14/01108 aimed at integrating into an avionics system, comprising a core module and a peripheral module, additional functionalities without needing to modify the software elements of the core module and using from the latter only generic services which are offered. Thus, the impact of integrating new services or functionalities on a core module of high development level such as an FMS and/or an PA is minimized.

However, the insertion of new hardware, of peripheral type, and of a lower development level than that of a core module, into existing so-called "Legacy" architectures, and supporting new functionalities of compatible development level, itself has a crippling development cost in terms in particular of the re-wiring of thousands of aircraft, the hardware integration of the new computer into the bay for interfacing it with other equipment, and its electrical power supply.

Thus, the technical problem of defining an architecture of an avionics onboard system which is more flexible and more adaptable, and which makes it possible to ensure the integration of new navigation functions at minimum cost, while guaranteeing clients the DAL level of the whole, still remains.

Thus, this need exists particularly when involved in defining an open navigation architecture of server-client type which makes it possible to integrate the manoeuvres for relative spacing (referred to by the acronym FIM for Flight Interval Management) between aircraft.

This therefore involves redefining collaborations and functions between aircraft systems which make it possible to place a new operational service, which minimize the costs of integration into a navigation system with open architecture whose core is a computer of FMS and/or PA type of high DAL and at least one peripheral computer of lower DAL, which minimize staff training and maintenance costs, and which minimize more particularly the impact on the computers of high criticality (in particular the FMS whose development cost is currently among the aircraft's highest because of its size and criticality).

The general technical problem is to propose a method for operationally, functionally and physically integrating a new aeronautical service or function into an onboard avionics system with open architecture of "client-server" type, which minimizes the means for developing the integration of the new function in terms of extra hardware, interfacing and software, of reuse of hardware, interfacing and software, of number of tasks and of hardware and software qualification time, and which minimizes the means for operating the service in terms of maintenance and training time, while guaranteeing the client the DAL level of the aircraft as a whole.

In a particular manner, the technical problem is to propose a method for operationally, functionally and physically integrating an FIM manoeuvres service for the relative spacing between aircraft into an onboard avionics system of "client-server" type, which minimizes the means for developing the integration of the new function in terms of extra hardware, interfacing and software, of reuse of hardware, interfacing and software, of number of tasks and of hardware and software qualification time, and which minimizes the means for operating the service in terms of maintenance and training time, while guaranteeing the client the DAL level of the aircraft as a whole.

The technical problem is further to provide an integrating onboard avionics system with open architecture of "client-server" type which operationally, functionally and physically integrates an application of FIM manoeuvres for the relative spacing between aircraft while minimizing the means for developing the integration of the application in terms of extra hardware, interfacing and software, of reuse of hardware, interfacing and software, of number of tasks and of hardware and software qualification time, and which minimizes the means for operating the application in terms of maintenance and staff training time, in compliance with the DAL level of the aircraft as a whole.

SUMMARY OF THE INVENTION

For this purpose, the subject of the invention is a method for functionally and physically integrating a new navigation service to be integrated into an avionics onboard system, the avionics onboard system comprising:

a DAL+ digital core computer, having a first criticality level DAL+, integrated into an initial architecture of peripheral computers and databases having second safety criticality levels DAL−, lower than or equal to the first criticality level DAL+, and serving as server by hosting a first plurality of generic open services Serv_DAL+(j), and a DAL− peripheral computer for managing the new service to be integrated, having a second criticality level DAL−, lower than or equal to the first criticality level DAL+, by dispatching service requests to the DAL+ digital core computer and/or to the computers and databases of the initial architecture through a communications network, characterized in that the method for functionally and physically integrating the new service comprises the steps consisting in:

functionally decomposing the new service into a second plurality of elementary functions FU(i);

determining, on the basis of the second plurality of the elementary functions FU(i), a first list of the elementary functions that can be executed in part or entirely by at least one generic open service, and for each elementary function a first sub-list of generic open service(s);

determining an optimal functional and physical distribution of the elementary functions FU(i) within the onboard avionics system over the set of possible distributions which minimizes a global cost criterion CG, dependent on several parameters, including at least the additional development cost of the elementary functions integrated within the DAL+ digital core computer; and carrying out the integration of the new navigation service by actually implementing the elementary functions and their scheduling according to the optimal functional and physical distribution determined within the onboard avionics system.

According to particular embodiments, the method for functionally and physically integrating a new navigation service comprises one or more of the following characteristics:

the optimal functional and physical distribution of the elementary functions FU(i) within the onboard avionics system over the set of possible distributions is determined so as to minimize a first global cost criterion CG1 which takes into account only the additional development cost of the elementary functions integrated within the DAL+ digital core computer; and the integration of the new navigation service is carried out by actually implementing the elementary functions and their scheduling according to the optimal functional and physical distribution determined within the onboard avionics system by using the first criterion CG1;

the optimal functional and physical distribution of the elementary functions FU(i) within the onboard avionics system over the set of possible distributions is determined so as to minimize a second global cost criterion CG2 which also takes into account the development cost of the communication interfaces between the DAL+ core computer and the peripheral computers, the cost in response time and the cost of maintainability so as to minimize the communication exchanges; and the integration of the new client navigation service is carried out by actually implementing the elementary functions and their scheduling according to the optimal functional and physical distribution determined within the onboard avionics system by using the second criterion CG2;

the optimal functional and physical distribution of the elementary functions FU(i) within the onboard avionics system over the set of possible distributions is determined so as to minimize a third global cost criterion CG3 which also takes into account the development of certain segments of code of low DAL level in the DAL+ core computer so as to minimize the complexity of the whole from the perspective of maintenance and upgrades; and the integration of the new navigation service is carried out by actually implementing the elementary functions and their scheduling according to the optimal functional and physical distribution determined within the onboard avionics system by using the third criterion CG3;

the optimal functional and physical distribution of the elementary functions FU(i) within the onboard avionics system over the set of possible distributions is determined so as to minimize a fourth global cost criterion CG4 which also takes into account the use of DAL+ level code libraries in the peripheral computer of level DAL− to minimize the use of the resources of the DAL+ core computer; and the integration of the new navigation service is carried out by actually implementing the elementary functions and their scheduling according to the optimal functional and physical distribution determined within the onboard avionics system by using the fourth criterion CG4;

the method for integrating the new navigation service furthermore comprises an additional step, executed after having determined an optimal functional and physical distribution of the elementary functions FU(i) within the onboard avionics system, and consisting in the performance of the new navigation service being verified and evaluated by emulation or simulation, and/or the performance of the initial services implemented on the core computer and the peripheral computers being verified;

the new navigation service is an FIM navigation service for manoeuvres for the relative spacing between aircraft integrated functionally and physically into the onboard navigation system; and the FIM spacing manoeuvre is characterized by a succession of elementary functions FIM_FU(i); and the DAL+ digital core computer hosts services Serv_DAL+(j) for computing temporal predictions according to a specified guidance mode and which are used for the implementation of part of the elementary functions making up the spacing manoeuvre OPEN_FIM; and the DAL+ digital core computer is coupled to computers for piloting the aircraft;

the generic services Serv_DAL+(j) for computing temporal predictions according to a guidance mode comprises:

A first service Serv_DAL+(1) for temporal integration with a view to obtaining predictions according to a vertical guidance mode from among:
  Climb with fixed thrust and longitudinal speed setpoint (CAS, TAS, MACH or GS); so-called 'Open Climb' mode in the conventional terminology;
  Climb with longitudinal speed setpoint and vertical speed setpoint (V/S); so-called "CLIMB VS/SPEED" mode in the conventional terminology;
  Climb with longitudinal speed setpoint and slope setpoint (FPA); so-called "CLIMB FPA/SPEED" mode in the conventional terminology;
  Descent Modes (OPEN DES, VS, FPA, mirroring the climb modes); according to a horizontal guidance mode from among:
  Acquisition and Holding of heading (Heading mode)
  Acquisition and Holding of Course (Track or Course mode)
  FMS Trajectory tracking (LNAV Lateral Navigation mode)
  Radioelectric beam tracking (VOR, DME, LOC, etc.)
  Acquisition and Holding of lateral roll,
  Acquisition and Holding of attitude,
  Acquisition and Holding of vertical attack angle, and
a second service Serv_DAL+(2) for integrating the weather on various levels and in the lateral plane;
a third service Serv_DAL+(3) for selecting a particular configuration as input,
a fourth service Serv_DAL+(4) for dispatching guidance setpoints of the service Serv_DAL+(1) to the automatic devices of the aircraft;

the FIM avionics method for the relative spacing manoeuvre comprises the following elementary functions:

A first elementary function FIM_FU(1) for selecting target navigation element and intermediate elements A second elementary function FIM_FU(2) for selecting the guidance mode to rejoin the target element A third elementary function FIM_FU(3) for computing the predictions giving a position and a time of transit of the FIM aircraft over the intermediate elements A fourth elementary function FIM_FU(4) for forecasting the reference aeroplanes, at the instants corresponding to the time of transit A fifth elementary function FIM_FU(5) for selecting a minimum spacing ITP to be complied with A sixth function FIM_FU(6) for computing and displaying the spacing between the FIM aircraft and the reference aircraft over the intermediate elements A tenth elementary function FIM_FU(10) for executing the vertical manoeuvre;

the FIM avionics method for the relative spacing manoeuvres optionally comprises some of the following additional elementary functions:

A seventh elementary function FIM_FU(7) for detecting conflict

An eighth elementary function FIM_FU(8) for proposing a change of guidance mode

A ninth elementary function FIM_FU(9) for proposing a change of manoeuvre (vertical or lateral)

An eleventh elementary function FIM_FU(11) for monitoring the spacing during the manoeuvre A twelfth elementary function FIM_FU(12) for computing the weather profile over the FIM zone, at the various trajectory elements, so as to refine the predictions of the fourth elementary function FIM_FU(4)

A thirteenth elementary function FIM_FU(13) for modifying the aircraft state for computing the predictions of the fourth elementary function FIM_FU(4);

the following elementary functions are allocated to and implemented in the DAL+ digital core computer:
  FIM_FU(4) which corresponds to its service Serv_DAL+(1) called for various intermediate elements
  FIM_FU(10) which corresponds to the service Serv_DAL+(4) for the selected guidance mode and the selected navigation element;

while the remaining elementary functions are allocated and dlm implemented in the DAL− peripheral computer;

the elementary function FIM_FU(10) which corresponds to the service Serv_DAL+(4) for the selected guidance mode and the selected navigation element is allocated to and implemented in the DAL+ digital core computer; while the elementary function FIM_FU(4) which corresponds functionally to its service Serv_DAL+(1) called for various intermediate elements is allocated and implemented in the DAL− peripheral computer;

the elementary functions FIM_FU(1), FUM_FU(2) and FIM_FU(10) are allocated to and implemented in the DAL+ digital core computer, only the function FIM_FU(10) corresponding to the use of an existing generic service Serv_DAL+(4) for the selected guidance mode and the selected navigation element; while the elementary function FIM_FU(4) which corresponds functionally to its service Serv_DAL+(1) called for various intermediate elements is allocated and implemented in the DAL− peripheral computer;

the first elementary step FIM_FU(1) comprises the steps consisting in selecting a desired flight level for a vertical manoeuvre and/or selecting a manoeuvre start point as in particular a merge point for a lateral manoeuvre;

the second elementary step FIM_FU(2) comprises the steps consisting in selecting a vertical guidance mode for the vertical manoeuvre and a lateral guidance mode for the lateral manoeuvre, and selecting intermediate altitudes for the vertical manoeuvre and a lateral waypoint for the lateral manoeuvre;

the third elementary function FIM_FU(3) comprises the steps consisting in:
computing predictions of crossing time T for the intermediate altitudes according to the selected vertical guidance mode, up to the desired altitude for an ITP manoeuvre; and/or
computing predictions of crossing time T for the intermediate positions according to the selected lateral guidance mode, up to the end of the lateral manoeuvre for an FIM H manoeuvre;

the fourth elementary function FIM_FU(4) comprises the steps consisting in forecasting traffic at the intermediate elements until the instant T;

the sixth elementary function FIM_FU(6) comprises the steps consisting in computing the relative spacing in terms of position between the crossing prediction and the forecast of the traffic, and in comparing it with respect to a fixed threshold in the fifth step FIM_FU(5).

The subject of the invention is also an avionics onboard system configured to implement a new navigation service and to integrate it functionally and physically, the avionics onboard system comprising:

a DAL+ digital core computer, having a first criticality level DAL+, integrated into an initial architecture of peripheral computers and databases having second criticality levels DAL−, lower than or equal to the first criticality level DAL+, and serving as server by hosting a first plurality of generic open services Serv_DAL+(j); and a DAL− peripheral computer for managing the new navigation service, having a second criticality level DAL−, and serving as client by dispatching service requests to the DAL+ digital core computer and/or to the peripheral computers and databases of the initial architecture through a communications network;

the new navigation service being decomposed into a plurality of elementary functions FU(i) distributed physically between the DAL+ digital core computer and the peripheral management computer DAL− according to an optimal distribution scheme determined by the method of integration defined hereinabove; the peripheral management computer 6 DAL− being configured to support an application from among: an MMI, an integrated MSI, a CMU, a TCAS, a TAWS, an EFB, a tablet, a TRAFFIC COMPUTER, a dedicated generic partition, and the digital core computer 4 DAL+ being configured to support an application from among: a flight management system FMS, an Automatic Pilot (AP), an FMGS system combining the FMS and PA functions.

BRIEF DESCRIPTION OF DRAWINGS

The invention will be better understood on reading the description of several embodiments which will follow, given solely by way of example and while referring to the drawings in which.

DETAILED DESCRIPTION

Figure 1:
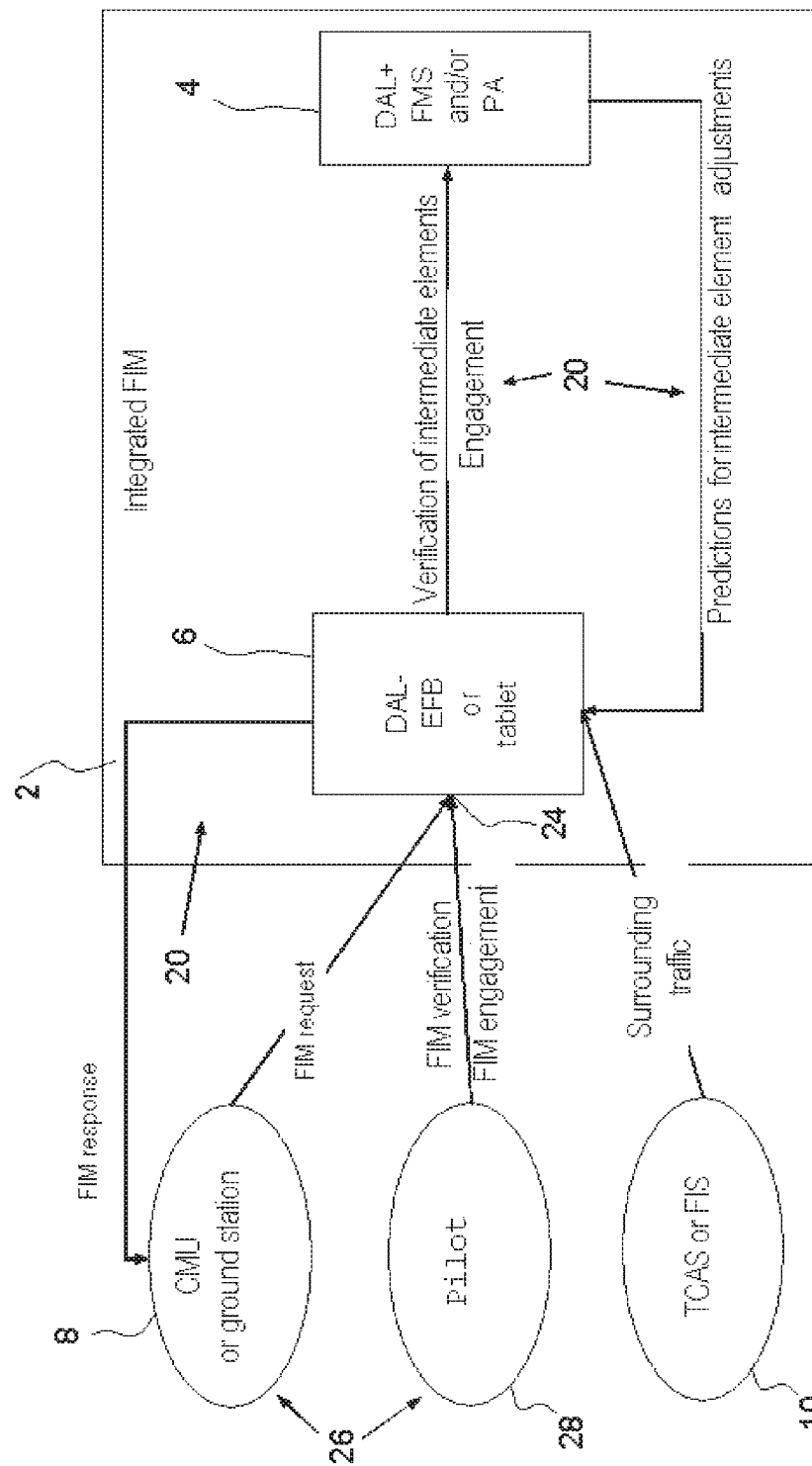
FIG. 1 is a view of an onboard avionics system with open architecture of client-server type, centred on a high-DAL DAL+ core computer and configured to integrate at low cost a new service, here an FIM manoeuvres function.

According to FIG. 1, an onboard navigation system 2 comprises at least two computers, namely a digital navigation core computer 4 and at least one peripheral computer, here three computers 6, 8, 10, and a communication network 20 linking the digital core computer 4 and the peripherals 6, 8, 10, the said communications network 20 being represented only in a functional manner in FIG. 1.

Computer is understood to mean a hardware and software computation chain. A computer can consist of several housings and/or hardware boards and/or of several software partitions. The redundancy, dissimilarity, surveillance and monitoring of a computation by a second chain or any other diversification method known to the person skilled in the art enter into the definition of this term.

The onboard navigation system 2 is configured to implement a new service, here and by way of example an FIM manoeuvres service for the relative spacing between aircraft.

One of the peripheral computers, here the peripheral computer 6, is for example a tablet or an EFB (Electronic Flying Bag), configured to manage or coordinate the tasks of the new service. This peripheral management computer 6 is connected through a communications network 20 to the digital core computer 4 and to the other two peripheral computers 8 and 10 so as to exchange diverse requests and functional responses that are relevant in relation to the service considered, here by way of illustration those of an FIM manoeuvres service for relative spacing between aircraft.

The digital core computer 4 is configured to support the FMS and/or PA functionalities while the peripheral computers 8, 10 are configured to support respectively the CMU (Communications Management Unit) functionalities or those of a ground station (peripheral computer 8) and the TCAS (Traffic Collision Avoidance System) or FIS (Flight Information System) functionalities (peripheral computer 10).

Generally and in order to support functionalities other than those of an FIM manoeuvres service, peripheral computers can support other functionalities such as those of a TAWS system (Terrain Awareness and Warning System) or those of a WMS system (Weather Management System).

The peripheral computer 6 for managing or coordinating the tasks of the FIM application comprises an inputs/outputs interface 24 for exchanging operational requests and responses with an operator environment 26 consisting for example of a pilot 28 and an AOC (Airline Operational Communication) or ATC (Air Traffic Control) ground station.

The digital core computer 4 is configured to operate as a server hosting a first plurality of generic open services Serv_DAL+(j), j being a pointing index of the generic service, and possesses a first safety level of software development or criticality DAL+.

The peripheral computers 6, 8, 10 possess a second safety level of software development DAL−, lower than or equal to the first safety level of software development DAL+. Among these, at least the peripheral computer 6 for managing the new service is configured to operate as a client in relation to the server 4.

Each computer of the onboard system is architectured and developed so as to address performance requirements, in particular in terms of failure rate (reset) and functional Quality of Service (QoS), in a defined framework of use. The onboard systems are qualified, with a demonstrated performance level, for a given environment.

These computers have different levels of software development which are more or less expensive: these software development levels arise from the aircraft risk analysis FHA (Functional Hazard Analysis), termed "operating dependability analysis", according to the international standards RTCA DO178C (USA) or ED-12C (European equivalent of EUROCAE). The operating dependability analysis establishes the contribution of the function in the aircraft operational chain to determine which maximum failure level (failure rate) must be reached. In order to achieve the objective in question, the standard constrains the required quality of the hardware and software in which the function is embedded.

Five separate levels of software development exist, from the most critical (level A) to the least critical (level E) in the standards RTCA DO178C and ED-12C:

Level A: A fault with the system or sub-system studied may cause a catastrophic problem—Safety of the flight or landing compromised—Aircraft crash Level B: A fault with the system or sub-system studied may cause a major problem entailing serious damage or indeed the death of some occupants Level C: A fault with the system or sub-system studied may cause a serious problem entailing a malfunction of the vital equipment of the craft Level D: A fault with the system or sub-system studied may cause a problem that could interfere with flight safety Level E: A fault with the system or sub-system studied may cause a problem that does not affect flight safety These levels of software safety development are called "DALs" (Development Assurance Levels). The constraint in hardware and software terms is fixed at the following values:

Level A: a maximum failure rate of $10^{-9}$/FH (FH=Flight Hours)

Level B: a maximum failure rate of $10^{-7}$/FH (FH=Flight Hours)

Level C: a maximum failure rate of $10^{-5}$/FH (FH=Flight Hours)

Level D: a maximum failure rate of $10^{-3}$/FH (FH=Flight Hours)

Level E: a maximum failure rate of $10^{-1}$/FH (FH=Flight Hours)

The peripheral computer 6 DAL− for managing the service is configured to support an application from among:
an MMI, an integrated MSI (Man System Interface)
a CMU
a TCAS
a TAWS
an EFB
a tablet
a TRAFFIC COMPUTER
a dedicated generic partition The digital core computer 4 DAL+ is configured to support an application from among:
a flight management system FMS,
an Automatic Pilot (AP)
an FMGS system combining the FMS and PA functions.

In this implementation, a function for allocating and sequencing elementary functions carrying out the new service or application, here the FIM manoeuvre service, can be implemented in the method of integration by a computer independent of the onboard avionics system 2, or hosted in one of the applications (for example in an EFB or tablet for dialogue with pilot or crew member, in a CMU for dialogue with the ground (company, control centres) or in the core computer 4 DAL+ which acts as filter in this case.

Figure 2:
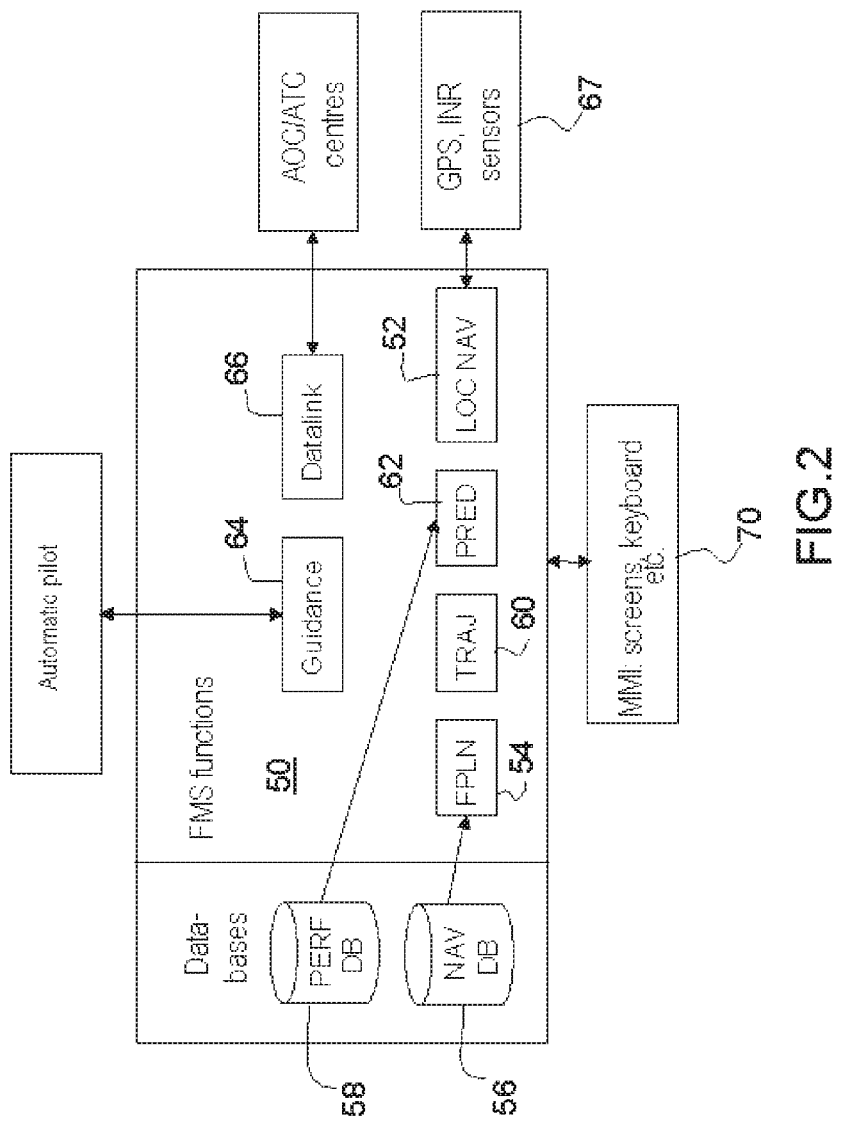
FIG. 2 is a view of the architecture of a DAL+ core computer supporting the FMS functionalities.

According to FIG. 2 and an exemplary functional architecture, a digital core computer 4 DAL+ supporting a standard FMS application 50 according to the ARINC 702A standard (Advanced Flight Management Computer System, December 1996), is configured to ensure all or part of the functions of:

Navigation LOCNAV 52 for performing optimal location of the aircraft as a function of geo-location means (GPS, GALILEO, VHF radio beacons, inertial platforms);

Flight plan FPLN 54 for inputting the geographical elements constituting the skeleton of the route to be followed (departure and arrival procedures, waypoints, airways);

Navigation database NAVDB 56 for constructing geographical routes and procedures with the help of data included in the bases (points, beacons, interception or altitude legs, etc.);

Performance database, PRF DB 58, containing the craft's aerodynamic and engine parameters.

Lateral trajectory TRAJ 60 for constructing a continuous trajectory on the basis of the points of the flight plan, complying with the aircraft performance and with the confinement constraints (RNP);

Predictions PRED 62 for constructing an optimized vertical profile on the lateral trajectory;

Guidance GUID 64 for guiding the aircraft in the lateral and vertical planes on its 3D trajectory, while optimizing the speed;

Digital data link DATALINK 66 for communicating with the control centres and other aircraft.

One of the roles of the FMS is to locate the aircraft using its sensors 67 (inertia platforms, GPS, radioelectric beacons). This is the LOC NAV part 52.

On the basis of the geographical information contained in the navigation database NAV DB 56, the pilot can construct his route, called the flight plan and comprising the list of waypoints. This is the role of the FPLN part 54. The FMS can manage several flight plans. One of them, known by the acronym "Active" in ARINC 702A designates the flight plan on which the aircraft is guided. There are working flight plans (sometimes called "secondary" or "inactive flight plans"), as well as transient flight plans (temporary flight plans).

The lateral trajectory is computed as a function of the geometry between the waypoints (commonly called LEGs)

and/or the altitude and speed conditions (which are used for computing the turning radius), by the TRAJ part 60.

Over this lateral trajectory, the FMS 50 optimizes a vertical trajectory (in terms of altitude and speed), passing through possible altitude, speed, time constraints, by using a modelling of the aerodynamic and engine performance contained in the PERF DB 58.

Knowing the location of the aircraft and the 3D trajectory, the FMS 50 can slave the aircraft to this trajectory. This is the GUIDANCE part 64.

All the information entered or computed by the FMS 50 is grouped together on MMI display screens 70 (MFD pages, ND and PFD, HUD or other views).

The communication with the ground (company, air traffic control) is carried out by the DATALINK part 66.

It should be noted that in the FMS terminology, the term "revision" is used to characterize an insertion/modification/erasure of data of the FMS system and that the word "Edition" is also commonly used.

In the current architectures and whatever the aircraft, the "Flight Planning" and "optimized trajectory" part is generally included in a dedicated computer called the "FMS" for "Flight Management System" (or flight management computer). These functions constitute the FM business core. This system can also host part of the "Location" and of the "Guidance". In order to ensure its mission, the FMS is connected to numerous other computers (a hundred or so).

Figure 3:
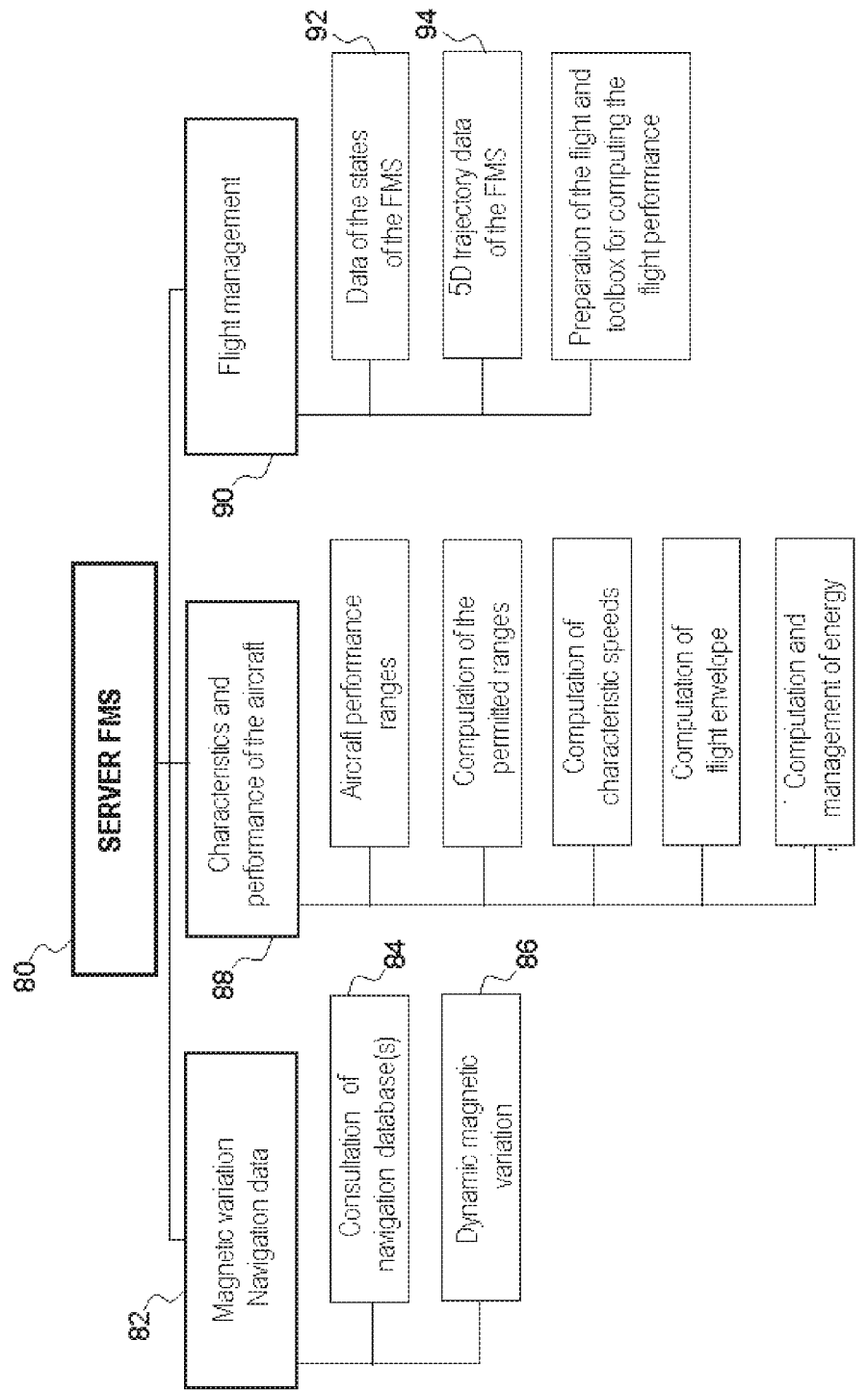
FIG. 3 is a view of the tree structure of the library of generic services offered by the DAL+ level computer supporting the FMS generic functionalities and acting as server.

According to FIG. 3, the generic open services Serv_DAL+(j) of a DAL+ computer supporting the set 50 of FMS functionalities make up an FMS server 80 and are classed in three categories.

A first category 82 of generic open services relates to the services for consulting geographical data 84 and magnetic declination 86 (navigation data & dynamic magnetic variation) which allow the clients to search for geographical information (NAV DB) or magnetic declination information (MAG VAR) on a point of the globe, most procedures still referring to magnetic north.

A second category 88 of generic open services relates to the services for consulting the performance of the aircraft ("aircraft characteristics & performance") involving TRAJ, PRED and PERF DB.

The services of the second category 88 provide:
bounds characteristic of the aircraft such as for example the minimum and maximum weights, the certified altitude ceiling; the takeoff and landing speeds, termed characteristic speeds; flight envelope computations (maximum speeds, stalling speeds, maximum roll, etc.)
integration computations according to chosen aircraft modes (climb a certain number X of feet at constant thrust, descend with determined air slope and frozen speed, turn with imposed angle, etc.), computations of benchmarks (for some FMSs, simplified performance computations can be defined in the PERF DB, just where the precision required is lower).

A third category 90 of generic open services relates to the "flight management" services, namely:
the consultation of the state of the aircraft 92 (position, speed, states of the systems connected to the FMS, such as the state of the engines, the automatic pilot engaged modes, etc, etc.)
the consultation and modification 94 of the flight plan and of the 5D trajectory
the consultation and modification of the flight initialization data (inputting of the takeoff speeds, cruising altitude, expected weather, modes of fuel consumption, etc.)
the services for predictions over a given time horizon according to defined modes of flight conduct (guidance) and aircraft state, such as for example in the cases:
of an automatic pilot wishing to ascertain the mean climb rate over 2000 ft of altitude change with 1 failed engine, of a fuel computer wishing to compare the average consumption with the FMS predictions of consumption, etc.
of a TCAS computer wishing to ascertain the horizontal (or 3D) progress of the aircraft according to a mode with determined lateral guidance and determined guidance in terms of speed.

Certain requests of generic open services, termed elementary, may correspond to unitary requests of generic services such as for example:
a request to retrieve airports around the aircraft, corresponding to a unitary service "Get_Airport" of the navigation database consultation service
a request to insert a company route in the ARINC AEEC 424 format for example, for a client is also a unitary service "INSERT_COROUTE" offered by the "Flight Preparation" part of the figure hereinabove
a request to consult the aircraft state (current fuel for example) corresponds to a Get_current_Fuel unitary service offered by the "Aircraft States" part)
a request to consult the aircraft's current flight envelope (min and max speeds for example) corresponds to a unitary service Get_flight_envelope offered by the "Flight envelope Computation" part).

Other more complex requests can be made up of a succession of elementary requests in the form of groups (or batches) of commands, such as typically, an "INSERT FPLN" request for inserting a flight plan as separate elements, such as performed currently by the DATALINK services for the companies (AOC) and control centres (ATC), defined in the ARINC standards 702A for AOC and DO258 for ATC.

The insertion of a complete flight plan is an "INSERT FPLN" request which in general comprises the following parameters, defined in the standards in question, namely:
Elements making it possible to compute the route to be followed:
Airports (departure, arrival, alternate)
Takeoff procedures (known as departure runway, SID, etc.)
Cruising procedures (known as airways)
Arrival procedures (known as arrival runway, STAR, VIA, etc.)
Go-around procedures (known as Missed Approach)
Clearance procedures on arrival near a diversion airport (known as alternate)
Waypoints in addition to the procedures
Navigation beacons
Altitude, speed, time constraints over the points arising from the above procedures or over the waypoints
Flight plan initialization elements, making it possible in addition to carry out the trajectory computations and predictions, namely:
The cruising level
The weight planned on takeoff
The performance index (known as Cost Index)
The initial position on takeoff
Environment elements over the flight plan:
Weather forecast along the flight plan in the form of wind and temperature data over the points arising from the above procedures or over the waypoints
Barometric setting forecast on departure and on arrival According to FIG. 4, a method 102 for functionally and physically integrating a new navigation service into an avionics onboard system 2, of open architecture, such as for example defined in FIG. 1, comprises a set of first, second, third, fourth, fifth, sixth, seventh steps 104, 106, 108, 110, 112, 114, 116.

In the first step 104, the compatibility of the criticality level of the new service to be integrated with the development level of the DAL+ core computer is verified. After having determined the criticality level associated with the new service, it is compared with the criticality level of the DAL+ core computer. If the criticality level of the new service is lower than or equal to that of the DAL+ navigation computer, the new service is a candidate to be implemented in part on a DAL− peripheral computer of lower level in the broad sense. Otherwise, the new service must be executed reusing the architecture of the system to include therein a computer of higher criticality level than that of the DAL+ digital core computer initially planned.

Next, in the second step 106, when the criticality level is lower than or equal to that of the DAL+ digital core computer, the computational capabilities of the open-architecture DAL+ digital core computer are catalogued and classified according to a library of generic services Serv_DAL+(1), . . . , Serv_DAL+(j), . . . , Serv_DAL+(n_Serv), these generic services resulting from the open architecture concepts that are beginning to be seen in critical computers such as for example the FMS.

The general classification of these services Serv_DAL+(j) in the case of a digital core computer supporting the FMS functionalities is described in FIG. 3 and the text of the description relating thereto.

Thereafter, in the third step 108, a functional analysis of the new service to be integrated is performed by decomposing the said new service to be integrated into a second plurality of elementary functions FU(1), . . . , FU(i), . . . , FU(n_FU), i designating a pointer of the elementary functions varying from 1 to the total number n_FU of elementary functions.

Next, in the fourth step 110, for each elementary function FU(i) determined in the third step 108, one determines whether the elementary function FU(i) can be performed in part or entirely by a generic service Serv_DAL+(j) of the DAL+ navigation and digital core computer 4. Thus, on the basis of the second plurality of the elementary functions FU(i), a first list of the elementary functions that can be executed in part or entirely by at least one generic open service is determined together with, for each elementary function FU(i), a first sub-list of generic open service(s). Stated otherwise, a correspondence table (or mapping) is established between the elementary functions FU(i) of the new service to be integrated and the generic open service(s) usable by each of them.

Next, in the fifth step 112, a global cost criterion CG is taken into account to determine an optimal functional and physical distribution of the elementary functions FU(i) within the onboard avionics system 2 over the set of possible distributions which minimizes the said global cost criterion CG.

Generally, the global cost criterion "CG" is dependent on several parameters, including at least the development cost of an elementary function in the DAL+ core computer.

According to a first embodiment CG1 of the global criterion CG, the global cost criterion CG1 depends only on the development cost of elementary functions within the DAL+ core computer and/or DAL+ level code library computer.

The other parameters that can be taken into account are: the development cost of the communication interfaces between the two computers 4 DAL+ and 6 DAL−, the cost in response time, the estimated maintenance cost, the training cost, the cost of maintaining and upgrading the function, and optionally other costs to be defined by the designer.

According to a second embodiment CG2 of the global cost criterion CG, it may be more beneficial overall to develop certain segments of code of low DAL level, in the DAL+ computer so as to minimize the exchanges that are expensive in terms of response time, setup of communication interfaces, and maintainability.

According to a third embodiment CG3 of the global cost criterion CG, it may be more beneficial overall to develop certain segments of code of low DAL level, in the DAL+ computer so as to minimize the complexity of the whole, from the perspective of maintenance and upgrades.

According to a fourth embodiment CG4 of the global cost criterion CG, it may be more beneficial overall to use DAL+ level code libraries, in the low DAL computer, to minimize the use of the resources of the DAL computer.

Thereafter, in the sixth step 114, the implementation of the computations, interfaces and sequencing of the computations between the two computers DAL+ and DAL− is undertaken according to the optimal functional and physical distribution of the elementary functions FU(i) which minimizes the global cost criterion CG.

Finally in a seventh step 116, the new service integrated in an optimal manner into the onboard navigation system is executed by coupling the DAL+ core computer and the peripheral management computer 6 DAL−.

Generally a new service or new application to be integrated into the onboard avionics system according to the method of integration 102 falls within the set of the following services:

The computation of the next flight: the current flight being in the FMS, the following flight is prepared on a tablet or an integrated MSI, and the predictions are asked for on the said FMS, the tablet comprising information relating to the "ground" phase between the two flights involving disembarkation, refueling, embarkation;

The determination of an operational impact of failures: a system for managing rerouting or modification of flight level or aircraft speed following a failure, dialogue with the FMS to evaluate the various alternatives before engaging the operational procedure;

First example relating to the management of an engine failure: an engine failure makes it necessary to descend because of the loss of lift caused, but while paying attention to the relief, in particular in mountainous zones Second example relating to low fuel temperature conditions (the outside temperature dropping, the engines detect onset of kerosene icing, thus requiring reheating (with impacts on the predictions of the FMS) or the search for warmer transit zones);

Determination of ETOPS or of diversion airports for twin-engines, managed by a tablet: the choice of reroutings to the ETOPS will depend on the predictions computed by the FMS, and on company criteria (hotels, company presence) hosted by the tablet Management of stuck gear: the flight is possible even if the landing gear cannot be retracted, but the additional drag created has an effect on fuel consumption: the computer (for example a tablet) will ask for the FMS predictions to correct them for the additional drag effect, since the PERF DB databases of the FMS are not currently aware of the impact of the gear on the drag coefficient;

Ground/onboard continuity: continuity between the taxiing predictions of the TAXI computer and the flight predictions of the FMS is achieved by linking the time and the quantity of fuel;

Verification of the flight plan or Flight Plan check, in particular the functions for verifying the 3D FMS flight plan (or alternatives) with respect to the terrain, to the weather, to the traffic;

Various optimizations: this involves a function with complex optimizer in a tablet which computes a vertical profile according to rules and wishes to "test" the said profile by feeding it into the FMS to validate the time/fuel savings.

Figure 4:
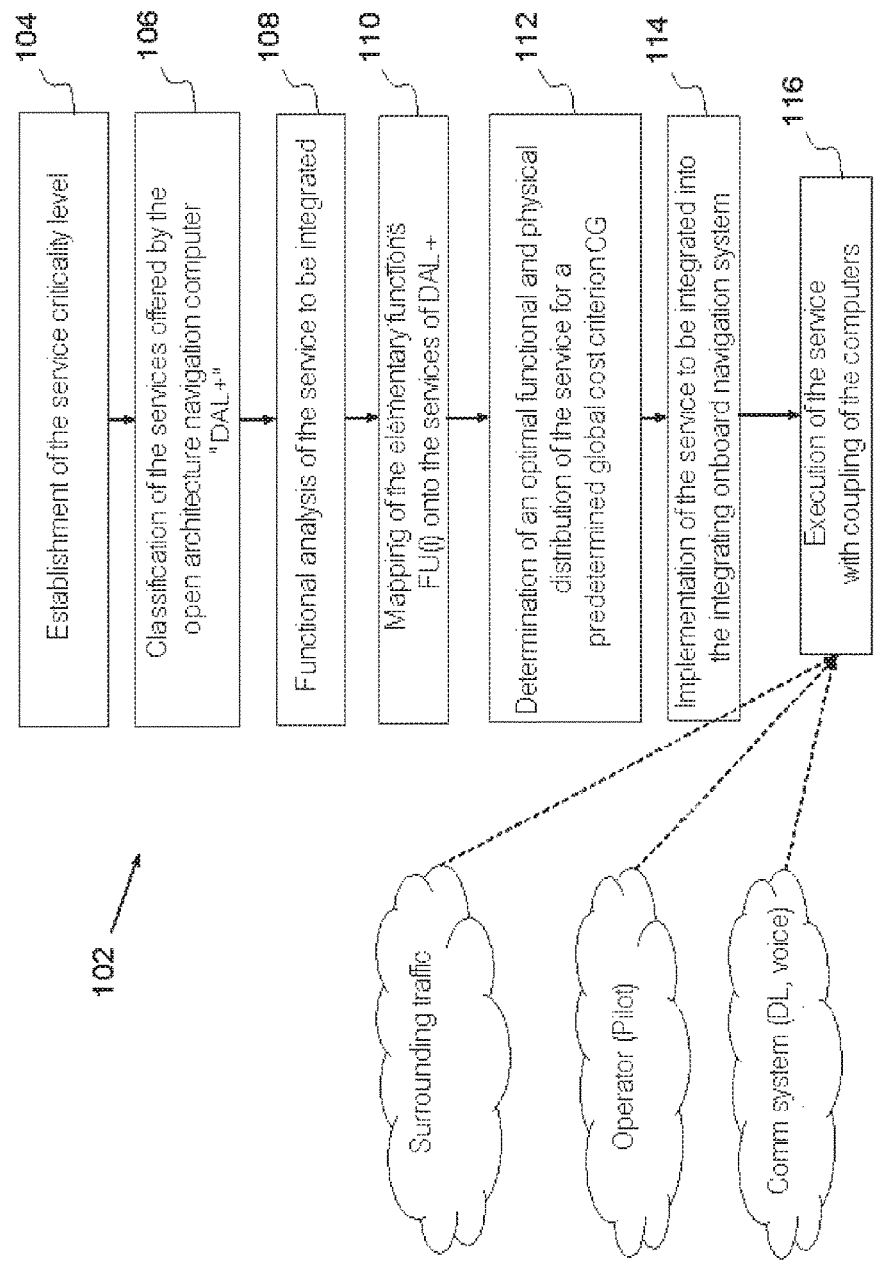
FIG. 4 is a flowchart of a method according to the invention for integrating a new service between the DAL+ level FMS core computer and the DAL− peripheral computer for managing the new service.
Figure 5:
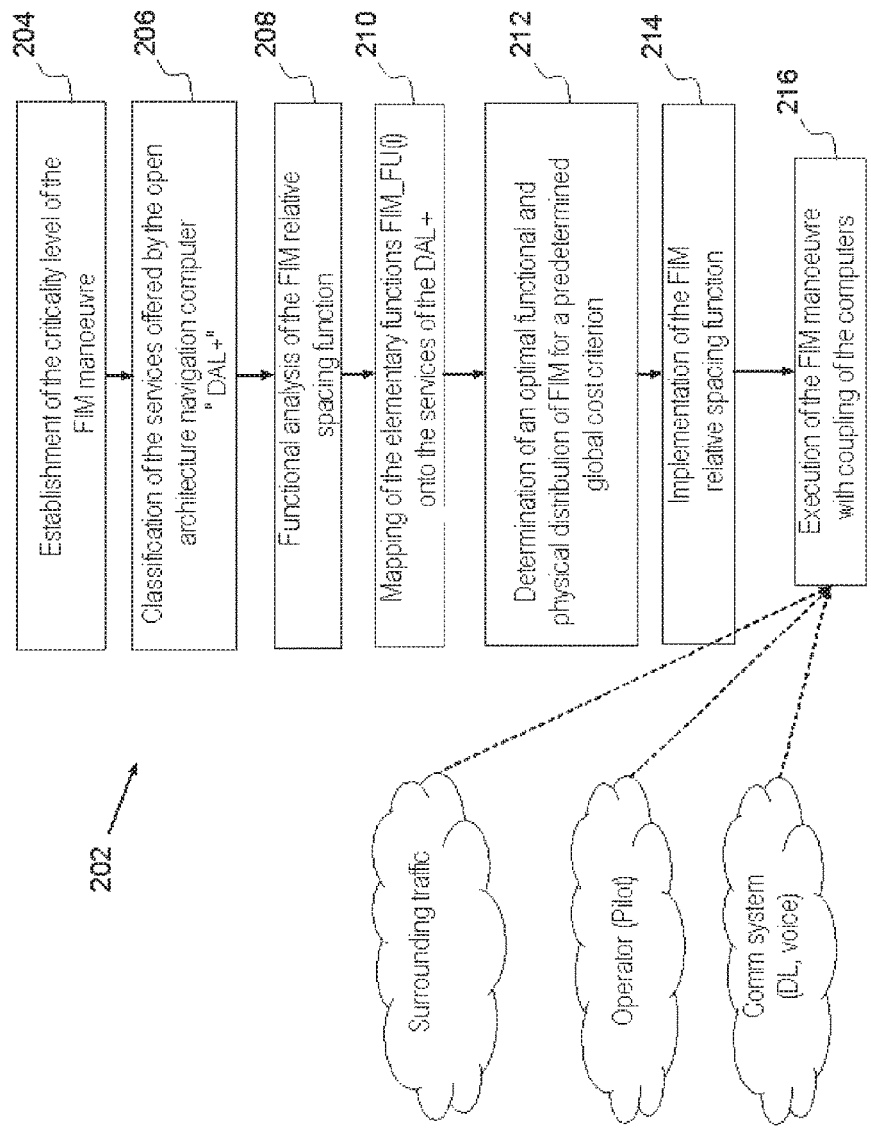
FIG. 5 is a flowchart of a method OPEN_FIM according to the invention for integrating a function of FIM manoeuvres between the DAL+ level FMS core computer and the DAL− peripheral computer for managing the FIM manoeuvres function.

According to FIG. 5, an optimal method 202 for functionally and physically integrating an FIM navigation application relating to the manoeuvres of relative spacing between aircraft into an avionics onboard system 2 of open architecture such as defined in FIG. 1, is referred to as OPEN_FIM and constitutes a particular implementation of the general method 102 of FIG. 4, in which the new navigation service to be integrated is an FIM manoeuvres service, that is to say manoeuvres for the relative spacing between aircraft.

These FIM manoeuvres are in particular standardized by the American organization RTCA in the document RTCA DO-328 (DO-328, Safety, Performance and Interoperability Requirements Document for Airborne Spacing-Flight Deck Interval Management (ASPA-FIM)).

The optimal method 202 for functionally and physically integrating the FIM navigation application for manoeuvres for the relative spacing between aircraft comprises a set of first, second, third, fourth, fifth, sixth, seventh steps 204, 206, 208, 210, 212, 214, 216 which correspond respectively to the first, second, third, fourth, fifth, sixth, seventh steps 104, 106, 108, 110, 112, 114, 116 of the general method 2 of FIG. 4.

In the first step 204, the compatibility of the criticality level of the FIM function for manoeuvres for the relative spacing between aircraft with the development level of the DAL+ core computer is verified. After having determined the criticality level associated with the FIM function, it is compared with the criticality level of the DAL+ core computer. If the criticality level of the FIM function is lower than or equal to that of the DAL+ core computer, the FIM function is a candidate to be implemented in part on a DAL− computer of lower level. Otherwise, the FIM function must be executed reusing the architecture of the system so as to include therein a computer of higher criticality level than that of the DAL+ digital core computer initially planned.

Next, in the second step 206, the generic services offered by the DAL+ digital core and open-architecture navigation computer are catalogued and classified according to the same library of generic services Serv_DAL+(1), . . . , Serv_DAL+(j), . . . , Serv_DAL+(n_Serv) as that provided by the second step 106 of FIG. 4, these generic services resulting from the concepts that are beginning to be seen in critical computers such as for example the FMS.

In the case of the vertical FIM manoeuvre, such as for example the ITP, the second step 206 will use the requests for predictions over a time or altitude or distance horizon given according to given vertical flight conduct (guidance) modes. Thus for an FMS application having an open architecture that allows predictions to be simulated, it will be possible to list first, second, third, fourth generic services Serv_DAL+(1), Serv_DAL+(2), Serv_DAL+(3), and Serv_DAL+(4).

The first generic service Serv_DAL+(1) relates to temporal integration with a view to obtaining predictions according to a vertical guidance mode from among:
Climb with fixed thrust and longitudinal speed setpoint (CAS, TAS, MACH or GS) or mode termed "OPEN CLIM" in the conventional terminology;
Climb with longitudinal speed setpoint and vertical speed setpoint (V/S) or mode termed "CLIMB VS/SPEED" in the conventional terminology;
Climb with longitudinal speed setpoint and slope setpoint (FPA) or mode termed "CLIMB FPA/SPEED" in the conventional terminology.

These modes are considered by way of example, it being possible to add other conventional modes of the aircraft, such as the holding of attitude and the holding of attack angle. It will also be possible to consider the same modes corresponding to descent, such as OPEN DES, etc.

The second service Serv_DAL+(2) relates to the integration of the weather, in the form of measurements and a weather model, on the various levels.

The third service Serv_DAL+(3) relates to the selection of particular configuration(s) as input parameters with a view to a simulation such as for example: the number of failed engines, an engine degradation coefficient (perf. factor, wear) or aerodynamic degradation coefficient (drag factor).

The second and third generic services Serv_DAL+(2), Serv_DAL+(3) can be advantageously added to the list of services offered by the DAL+ core computer, and will make it possible to refine the computation of the generic service Serv_DAL+(1).

The FMS (or the Automatic Pilot PA) proposes to manage the vertical guidance of the aircraft according to a desired mode. Thus a fourth generic service Serv_DAL+(4) for dispatching the guidance setpoints of the first generic service Serv_DAL+(1) to the automatic devices of the aircraft can be used by the FIM method.

In the case of a horizontal FIM manoeuvre, such as for example a manoeuvre termed "Merging", "Spacing", "Heading then Merge" according to the conventional terminology, the second step 206 of the method 202 OPEN_FIM will use the requests for predictions over a time or distance horizon given according to given horizontal flight conduct (guidance) modes. Thus for an FMS application having an open architecture which allows predictions to be simulated, it will be possible to enhance the first, second, third, fourth generic services Serv_DAL+(1), Serv_DAL+(2), Serv_DAL+(3), and Serv_DAL+(4) already listed.

The first generic service Serv_DAL+(1) also includes temporal integration with a view to obtaining predictions according to a horizontal guidance mode from among:
Acquisition and Holding of heading (Heading mode)
Acquisition and Holding of Course (Track or Course mode)
FMS Trajectory tracking (LNAV Lateral Navigation mode)
Radioelectric beam tracking (VOR, DME, LOC, etc.).

These modes are considered by way of example, it being possible to add other conventional modes of the aircraft, such as roll holding.

The second generic service Serv_DAL+(2) also relates to the integration of the weather in the lateral plane, in the form of measurements and a weather model.

The third generic service Serv_DAL+(3) remains the same and through the selection of particular configuration(s) as input parameters makes it possible to perform simulations.

The second and third generic services Serv_DAL+(2), Serv_DAL+(3), advantageously added to the list of services offered by the DAL+ core computer, will make it possible to refine the computation of the generic service Serv_DAL+(1) in the case of a horizontal FIM manoeuvre.

The FMS (or the Automatic Pilot PA) proposes to manage the horizontal guidance of the aircraft according to a desired mode. Thus the fourth generic service Serv_DAL+(4) for dispatching the guidance setpoints of the first generic service Serv_DAL+(1) to the automatic devices of the aircraft can be used by the FIM method.

Thereafter in the third step 208, a functional analysis of the FIM service for manoeuvres for the relative spacing between aircraft is performed by decomposing the FIM service to be integrated into a second plurality of elementary functions FIM_FU(1), . . . , FIM_FU(i), . . . , FIM_FU (n_FIM_FU), i designating a pointer of the elementary functions varying from 1 to the total number n_FIM_FU of elementary functions of the FIM service.

Subsequently, "FIM AIRCRAFT" will refer to the aircraft on board which is embedded the FIM function according to the invention, implemented in the said according to the method 202 OPEN_FIM, and which must space itself relatively with respect to the remainder of the traffic, composed of other aircraft called "Reference Aircraft".

Figure 6:
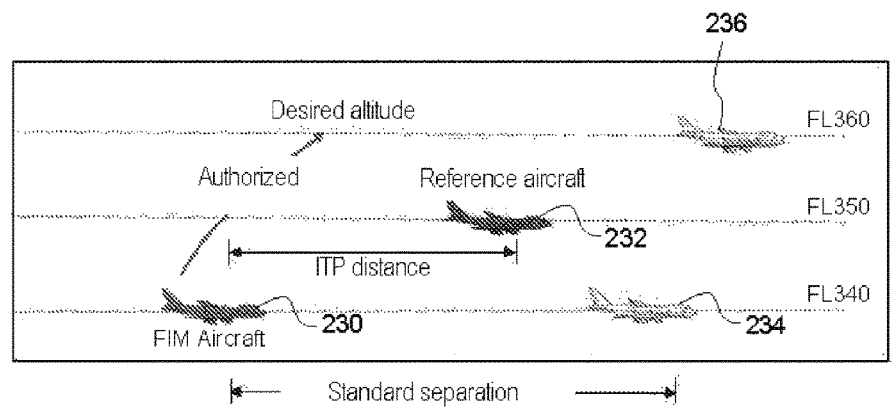
FIG. 6 is a view of a vertical FIM manoeuvre ITP.

In the case of the ITP (In Trail Procedures) vertical FIM manoeuvre and according to FIG. 6, the ITP manoeuvre consists operationally, for an aircraft 230 on board which is embedded the FIM function, and called "FIM Aircraft", in changing flight level FL ("Flight Levels") while ensuring a longitudinal separation with the aircraft 232, 234, 236 that occupy the various levels traversed, these aircraft being called "Reference Aircraft".

The elementary functions FIM_FU(1), . . . , FIM_FU(i), . . . , FIM_FU(n_FIM_FU) in their order of sequencing of the FIM function for manoeuvres for the relative spacing between aircraft and which will subsequently be allocated between the DAL+ core computer and the DAL− peripheral computer are as follows:

A first elementary function FIM_FU(1) for selecting a "navigation element" defined by a "target flight level" (Desired_Level) and intermediate altitudes or "intermediate trajectory elements" in the vertical plane;

A second elementary function FIM_FU(2) for selecting the vertical guidance mode so as to rejoin the target level;

A third elementary function FIM_FU(3) for computing the predictions giving the position and the time of transit of the "FIM AIRCRAFT" aircraft on intermediate altitudes or "intermediate trajectory elements" in the vertical plane;

A fourth elementary function FIM_FU(4) for acquiring the reference aircraft and for forecasting reference aircraft, at the instants corresponding to the time of transit;

A fifth elementary function FIM_FU(5) for selecting a minimum spacing to be complied with (ITP distance);

A sixth elementary function FIM_FU(6) for computing and displaying the spacing between the aircraft 230 "FIM Aircraft" and the one or more aircraft "Reference Aircraft" on the "intermediate trajectory elements";

A tenth elementary function FIM_FU(10) for executing the vertical manoeuvre.

The FIM function for the relative spacing manoeuvres optionally comprises some of the following additional elementary functions:

A seventh elementary function FIM_FU(7) for detecting conflict;

An eighth elementary function FIM_FU(8) for proposing a change of vertical guidance mode;

A ninth elementary function FIM_FU(9) for proposing a change of target level;

An eleventh elementary function FIM_FU(11) for monitoring the spacing during the manoeuvre A twelfth elementary function FIM_FU(12) for computing the weather profile over the ITP zone, at the various flight levels, so as to refine the predictions of the fourth elementary function FIM_FU(4)

A thirteenth elementary function FIM_FU(13) for modifying the state of the "FIM AIRCRAFT" aircraft for computing the predictions of the fourth elementary function FIM_FU(4)

Figure 7:
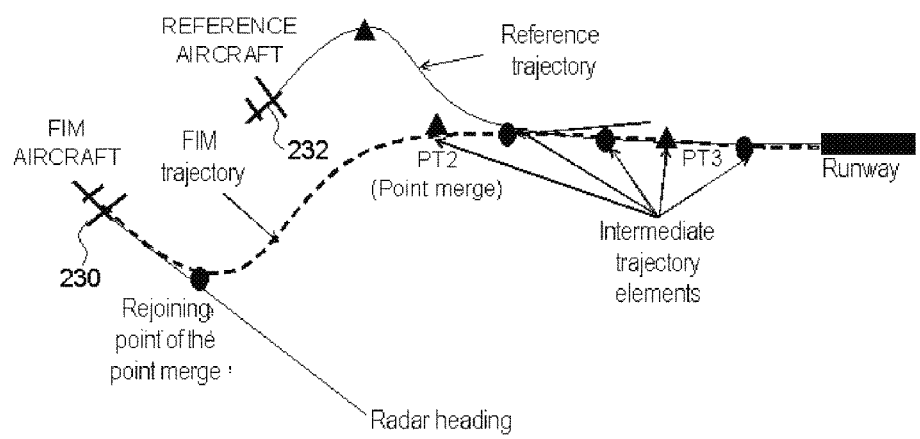
FIG. 7 is a view of a horizontal FIM manoeuvre of HTMB type.

In the case of a horizontal FIM manoeuvre such as for example the manoeuvres referred to as "spacing", "merging", "Heading Then Merge Behind" (HTMB) according to the conventional terminology, the horizontal FIM manoeuvre consists, for the aircraft 230, referred to as "FIM AIRCRAFT", in following a target craft 232, referred to as "REFERENCE AIRCRAFT", while maintaining a safety spacing with respect to the latter, in terms of distance (typically a few nautical miles NM in terms of approach) or time (typically 30 to 60 seconds). For example, in the case of a spacing manoeuvre of "Heading Then Merge Behind" (HTMB) type and according to FIG. 7, this involves proceeding according to a radar heading specified by the control tower and then in rejoining the merge point from a computed "rejoining point" so as to ensure that the relative spacing in distance or time will be held with the "REFERENCE AIRCRAFT" target aircraft onwards of this "Point Merge" point.

The elementary functions FIM_FU(1), . . . , FIM_FU(i), . . . , FIM_FU(n_FIM_FU) in their order of sequencing of the FIM function for manoeuvres for the relative spacing between aircraft which will subsequently be allocated between the DAL+ core computer and the DAL− peripheral computer, defined for the vertical manoeuvres, are reused and also encompass the horizontal FIM manoeuvres.

Thus, the elementary functions FIM_FU(1), . . . , FIM_FU(i), . . . , FIM_FU(n_FIM_FU) in their order of sequencing of the FIM function for manoeuvres for the relative spacing between aircraft in the context of horizontal manoeuvres are as follows:

The first elementary function FIM_FU(1) for selecting a navigation element from which the manoeuvre begins: in the case of "Merging" which involves rallying a common point of approach of all the aircraft towards a runway, termed "Point Merge", the navigation element is the "Point Merge", or else perhaps the whole of the airspace between this "point merge" and the runway; in the case of "Spacing", where a simple relative spacing is required (climb, cruising or descent), the navigation element is undefined; in the case of an HTMB manoeuvre, the navigation element is the "Point Merge"; other examples of lateral manoeuvres are also possible;

The second elementary function FIM_FU(2) for selecting the lateral guidance mode so as to rejoin the target level, from among the modes listed in the second step 206;

The third elementary function FIM_FU(3) for computing the predictions giving the position and the time of transit of the aircraft ITP on intermediate "lateral trajectory elements", including at least the "navigation element";

The fourth elementary function FIM_FU(4) for acquiring the reference aircraft and for forecasting the "Reference Aircraft", at the instants corresponding to the time of transit; the fourth elementary function predicts the instants of transit of the reference aircraft at the waypoints of its flight plan as well as at the intermediate lateral trajectory elements;

The fifth elementary function FIM_FU(5) for selecting a minimum spacing to be complied with (FIM distance);

The sixth elementary function FIM_FU(6) for computing and displaying the spacing between the aircraft 230 "FIM Aircraft" and the aircraft 232 "Reference Aircraft" on the intermediate lateral trajectory elements (therefore including the waypoints after the "point merge")

The tenth elementary function FIM_FU(10) for executing the lateral manoeuvre The FIM function for the relative spacing manoeuvres optionally comprises in the case of the horizontal manoeuvres the following additional elementary functions:

The seventh elementary function FIM_FU(7) for detecting conflict;

The eighth elementary function FIM_FU(8) for proposing a change of lateral guidance mode;

The ninth elementary function FIM_FU(9) for proposing a change of lateral trajectory;

The eleventh elementary function FIM_FU(11) for monitoring the spacing during the manoeuvre The twelfth elementary function FIM_FU(12) for computing the weather profile at the waypoints, so as to refine the predictions of the fourth elementary function FIM_FU(4);

The thirteenth elementary function FIM_FU(13) for modifying the aircraft state for computing the predictions of the fourth elementary function FIM_FU(4).

Thus for the horizontal and vertical manoeuvres, the elementary functions of the same index can be merged because of an equivalence relation existing between the horizontal and vertical manoeuvres.

Next, in the fourth step 210 according to FIG. 5, for each elementary function FIM_FU(i) determined in the third step 208, one determines whether the elementary function FIM_FU(i) can be performed in part or entirely by a generic service of the existing navigation computer 4 DAL+. Thus, on the basis of the second plurality of the elementary functions FIM_FU(i), a first list of the elementary functions that can be executed in part or entirely by at least one generic open service is determined together with, for each elementary function FIM_FU(i), a first sub-list of generic open service(s). Stated otherwise, a correspondence table is established between the elementary functions FU(i) of the new client service and the generic open service(s) usable by each of them.

Thus, it is determined that the digital core computer 4 DAL+ can deal with:

The fourth elementary function FIM_FU(4) which corresponds to the generic service Serv_DAL+(1) called for various intermediate altitudes in the case of vertical FIM manoeuvres (ITP) and called for various waypoints in the case of horizontal FIM manoeuvres;

The tenth elementary function FIM_FU(10) which corresponds to the generic service Serv_DAL+(4), for the vertical guidance mode and the target altitude which are selected in the context of ITP FIM manoeuvres, and for the lateral guidance mode and the "navigation element" which are selected in the context of horizontal FIM manoeuvres.

Thereafter in the fifth step 212, a global cost criterion CG is taken into account to determine an optimal functional and physical distribution of the elementary functions FIM_FU(i) within the onboard avionics system 2 over the set of possible distributions which minimizes the said global cost criterion CG.

Generally, the global cost criterion "CG" is dependent on several parameters, including at least the development cost of an elementary function in the DAL+ core computer.

According to a first embodiment CG1 of the global criterion CG, the global cost criterion CG1 depends only on the development cost of elementary functions within the DAL+ core computer and/or DAL+ level code library computer.

The other parameters that can be taken into account are: the development cost of the communication interfaces between the two computers 4 DAL+ and 6 DAL−, the cost in response time, the estimated maintenance cost, the training cost, the cost of maintaining and upgrading the function, and optionally other costs to be defined by the designer.

In the fifth step 212, the same embodiments CG2, CG3, CG4 of the global cost criterion CG as those considered in the fifth step 112 of the general method of integration 102 can be reused.

Next, in the sixth step 214, the implementation of the computations, interfaces and sequencing of the computations between the two computers DAL+ and DAL− is undertaken according to the optimal functional and physical distribution of the elementary functions FIM_FU(i) which minimizes the global cost criterion CG considered.

In the case where the first embodiment CG1 of the global criterion CG is considered, that is to say if only the additional development cost of the DAL+ core computer is integrated, the method 202 will allocate the elementary functions FIM_FU(4) and FIM_FU(10) to the DAL+ core computer. Since the other elementary functions do not correspond to the critical functional ambit of a flight management system FMS or of an automatic pilot PA, these functions are intended rather to be integrated into a DAL− computer.

In the case where the second embodiment CG2 of the global criterion is considered, that is to say if the additional development cost of the DAL+ core computer is integrated with the additional development cost of the interfaces, and if these costs alone are considered jointly, the method will allocate only the elementary function FIM_FU(10) to the DAL+ core computer, command of the automatic devices being critical for the aircraft and having to remain managed by a computer of high DAL level. It should be noted that in this case the integration of the fourth elementary function FIM_FU(4) will without doubt be of less good quality and reliability if it is developed in a DAL− computer of lower DAL. Operational procedures for reducing risk will have to be put in place to alleviate this defect such as graphical monitoring of the disparity, computation by the pilot, confirmation by a ground computer.

In the case of an embodiment of the global cost criterion combining the second embodiment CG2 and the third embodiment CG3 of the global cost criterion CG, the method 202 allocates the tenth elementary function FIM_FU (10), which already exists in the form of a generic service, and the first elementary function FIM_FU(1), which requires restricted development, to the core computer 4 DAL+ alone. Indeed, involving as it does an altitude for an ITP FIM manoeuvre or a waypoint for an HTMB FIM manoeuvre, these elements already exist in the DAL+ core computer. A preselection of an altitude and of a guidance mode is relevant at the level of the PA since the interfaces between the PA and the pilot in the aircraft. Likewise, a preselection of the waypoint is relevant at the level of the FMS since the interfaces between the FMS and the pilot already exist. This configuration limits the interface costs since the interfaces themselves already exist between the pilot and the PA/FM even if it is necessary to return the preselected elements to the peripheral computer 6 DAL− for managing the FIM service.

Finally, in the seventh step 216, the FIM function for manoeuvres for the relative spacing between aircraft, integrated in an optimal manner into the navigation system 2, is executed by coupling the DAL+ core computer and the at least one DAL− peripheral computer.

Figure 8:
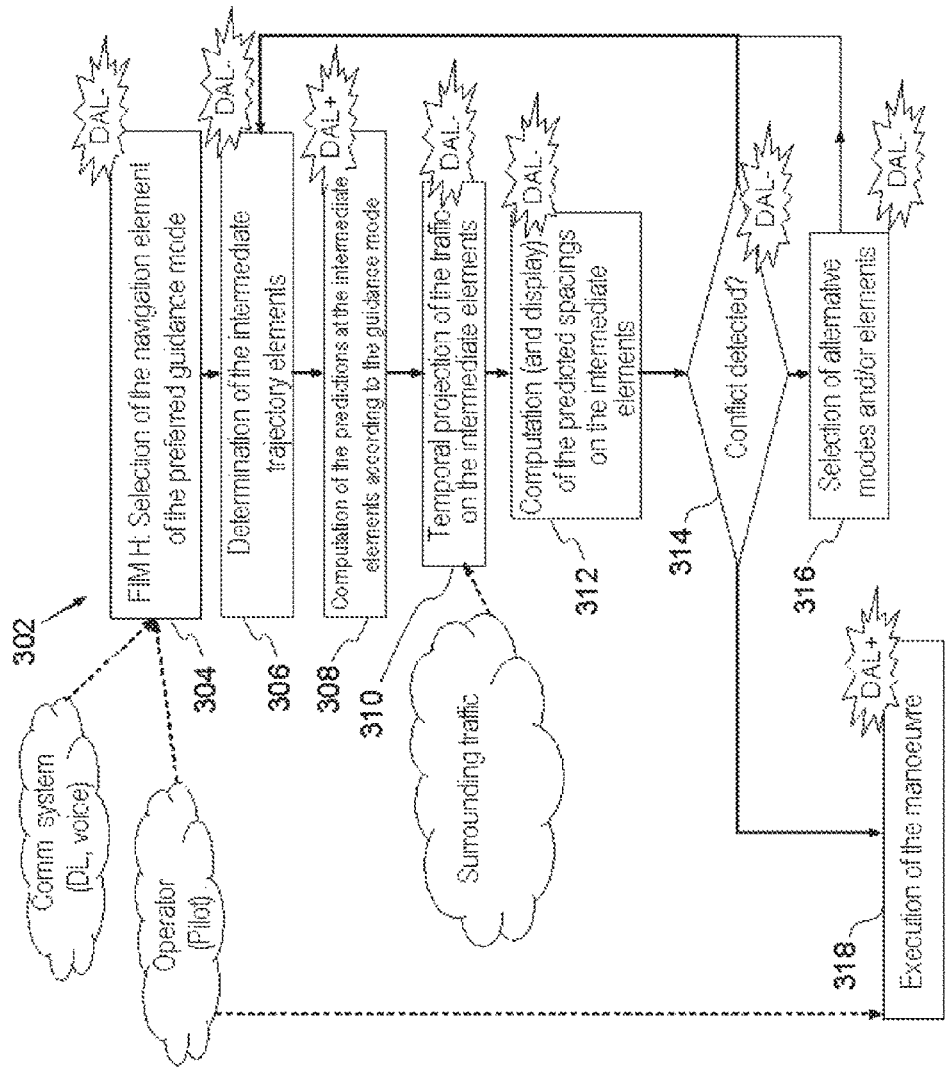
FIG. 8 is a flowchart of the execution of the FIM manoeuvres function integrated according to the method of integration OPEN_FIM of the invention of FIG. 5.

According to FIG. 8 and a first mode of implementation of the FIM function for manoeuvres for the relative spacing between aircraft according to the method 202 of the invention, the integrated FIM function for manoeuvres for the relative spacing between aircraft 302 comprises when it is executed by the avionics system 2 a set of steps.

In a first step 304, the DAL− management computer implements the following tasks:

the selection of the navigation element which corresponds to the execution of the first elementary function FIM_FU(1); the selected navigation element is the desired flight level for the ITP manoeuvre (vertical FIM), the trajectory element of "Point merge" type for the FIM horizontal function called "FIM H");

the selection of the preferred guidance mode which corresponds to the execution of the second elementary function FIM_FU(2).

This selection is performed by an interface with the operator who handles the DAL− peripheral computer.

In an alternative, the preferred guidance mode will be a predefined mode such as for example the OPEN mode for ITP and the LNAV mode for FIM H.

According to a first alternative, the preferred guidance mode is chosen on the DAL+ computer.

According to a second alternative, the desired flight level is chosen on the DAL+ computer.

On exiting the first step 304, two values are provided:

a desired element called "Desired_Element" which is a desired flight level (called "Desired_Level") for the ITP type vertical FIM manoeuvres, and which is a desired point (called "Desired_Point" for the horizontal FIM manoeuvres referred to as FIM H;

a preferred guidance mode, called in general "Preferred_Guidance_Mode", and which is referred to in particular as "Preferred_Vertical_Guidance_Mode" for the ITP type vertical FIM manoeuvres and "Preferred_lateral_Guidance_Mode" for the FIM H horizontal FIM manoeuvres.

Next in a second step 306, the DAL− computer implements the determination of the intermediate trajectory elements which corresponds to the execution of the first elementary function FIM_FU(1), the intermediate trajectory elements being intermediate altitudes for the ITP vertical FIM manoeuvres and intermediate waypoints for the FIM H horizontal FIM manoeuvres.

In the case of the ITP vertical FIM manoeuvres, this selection is performed in a predefined manner by analysing the altitudes situated between the current altitude of the aircraft (Current_Level) and the target altitude (Desired_Level), occupied by other aircraft. The DAL− computer is in communication with the receiving computers of the surrounding traffic, such as the TCAS or a TRAFFIC COMPUTER or a TRANSPONDER.

In the case of the FIM H horizontal FIM manoeuvres, the intermediate trajectory elements are waypoints created by the second step 306 itself.

According to an alternative, the DAL− peripheral computer will choose the intermediate elements at predefined intervals.

In the case of the ITP vertical FIM manoeuvres, the intermediate altitudes are chosen at intervals equal to or less than the flight levels authorized by the air traffic control. Typically, for levels authorized every 1000 ft (1000 feet), the DAL− computer chooses the altitudes by starting from the aircraft's present flight level, and by incrementing it or by decrementing it in intervals of 1000 ft up or down to the target altitude.

In the case of the FIM H horizontal FIM manoeuvres points equidistant from one another are for example chosen so as to ensure good precision of the interpolations between these points, or characteristic points of the lateral trajectory, such as for example the start and end points of turns, are chosen on the basis of the "point merge" if this point exists, and on the basis of the FIM Aircraft aircraft otherwise, until the end of the manoeuvre (consisting of the runway for the FIM manoeuvres during the approach for example). For example a distance spacing of 2 NM (nautical miles) or time spacing of 30 seconds can be chosen operationally for approach manoeuvres of HTMB type.

According to an alternative, the DAL+ computer performs the selection of the intermediate trajectory elements.

Thus on exiting this second step 306, a set of N intermediate elements is available in the form for example of a table such as Table 1 below.

TABLE 1

| Intermediate Element | ITP Context | FIM H Context |
|---|---|---|
| Elt_Int(1) | Current_Level = Alt_int(1) | Element_of_navigation = e.g. "Point Merge" |
| Elt_Int(2) | Alt_int(2) | Lateral intermediate trajectory element (2) |
| ... | ... | |
| Elt_Int(k) | Alt_int(k) | Lateral intermediate trajectory element (k) |
| ... | ... | |
| Elt_Int(N) | Desired_Level = Alt_int(N) | Manoeuvre end point = e.g. Runway. |

Thereafter in a third step 308, the predictions at the intermediate trajectory elements according to the guidance mode are computed by the DAL+ computer according to a first embodiment. This step 308 corresponds to the execution of the third elementary function FIM_FU(3).

In the case of ITP vertical FIM manoeuvres, the climb (or the descent) towards the target altitude is computed by the DAL+ core computer. The latter provides predictions at various altitudes, according to the guidance mode chosen, at intervals at least equal to or less than the intervals of the intermediate altitudes. In the example of the 1000 ft of the second step 306, the DAL+ core computer provides predictions at altitude intervals of less than or equal to 1000 ft. This guarantees that the DAL− computer will be able to retrieve sufficient prediction points to perform a reliable interpolation at the intermediate altitudes.

In the case of FIM H horizontal FIM manoeuvres, the lateral trajectory towards the navigation element and then up to the end of the manoeuvre is computed by the DAL+ core computer. The latter provides predictions at various intermediate points, according to the guidance mode chosen, at intervals of less than or equal to a minimum interval. With a minimum interval of 2 NM/30 sec described by way of example in the second step 306, the DAL+ core computer will provide predictions at intervals of less than or equal to 2 NM/30 sec. This guarantees that the DAL– computer can retrieve sufficient prediction points to perform a reliable interpolation at the intermediate waypoints.

This integration is carried out by the prior art schemes of current DAL+ systems (FMS or PA).

The advantage of this solution is that the DAL+ computer does not necessarily need to know the intermediate elements.

If for example, in a context of ITP vertical FIM manoeuvres, predictions are delivered every 250 ft, it is certain that the DAL– peripheral computer will be able to find good interpolations, whatever the intermediate altitudes. Indeed, aircraft are not authorized to be spaced apart by an altitude of less than 500 ft.

According to an alternative, the DAL+ core computer has access to the intermediate elements and will perform its climb/descent predictions, by providing predictions at the said intermediate elements. This solution requires an additional interface, but avoids the interpolation by the DAL– second computer.

On exiting this third step 308 predictions are available in the form of a table for example, such as Table 2 below comprising for each intermediate element as a minimum the position and the time of transit.

TABLE 2

| Elt_int(1) | Current_Position_set_at Predicted_Position(1) | Current_Time set at Predicted_time(1) |
|---|---|---|
| Elt_int(2) | Predicted_Position(2) | Predicted_Time(2) |
| ... | | |
| Elt_int(k) | Predicted_Position(k) | Predicted_Time(k) |
| ... | | |
| Elt_int(N) | Predicted_Position(N) | Predicted_Time(N) |

Next, in a fourth step 310, the temporal forecast of the traffic of the intermediate elements is computed by the DAL– peripheral computer according to the first embodiment. This step corresponds to the execution of the fourth elementary function FIM_FU(4).

In the case of ITP vertical FIM manoeuvres, the DAL– peripheral computer provides for each intermediate altitude Alt_int(k) and for each target aircraft situated on the level and close to the aircraft Traf1(k) ... TrafNT(k), the predicted position, by using the ground speed of each aircraft, this speed being retrieved in the prior art by the TCAS or ADS B computers.

For a given traffic m at an altitude k, and starting from an initial position Pini(m,k), with a ground speed GS(m,k), the estimated position will be computed via the formula:

Traffic_Position(m,k)=Pini(m,k)+GS(m,k)*(Predicted_Time(k)−Predicted_Time(1))

In an alternative, the DAL– computer provides the information necessary for the DAL+ computer on the various aircraft at the intermediate elements, allowing it to perform the computations above.

In an alternative, the DAL– computer computes the predicted time Traffic_Time(m,k) in order for the target aircraft (m,k) to reach the predicted position Predicted_Position(k). For example in the case of ITP vertical FIM manoeuvres:

Traffic_Time(m,k)=Predicted_Time(1)+[Predicted_Position(k)−Pini(m,k)]/GS(m,k)

According to an alternative, the DAL– peripheral computer computes the predicted altitude of the ITP aircraft Predicted_Alt(m,k) at the time Traffic_Time(m,k), via the schemes for interpolating the altitudes arising from table 2 determined in the third step 308.

Identical computations can be performed in the context of horizontal FIM manoeuvres. In an alternative, the computation will also take into account the vertical evolution of the various intermediate traffic (m,k) on the basis of their aerodynamic slope FPA(m,k) or their vertical speed V/S(m,k).

Thereafter in a fifth step 312, the predicted spacings on the intermediate elements are computed and displayed by the DAL– computer according to a first embodiment. This step corresponds to the execution of the sixth elementary function FIM_FU(6).

According to this first embodiment, this involves a longitudinal spatial spacing. For each traffic (m,k), the spacing is expressed by the equation below:

Spacing(m,k)=Traffic_Position(m,k)−Predicted_Position(k) in the same horizontal plane By using an axis starting from the FIM aircraft called "FIM AIRCRAFT", with an increasing position value as the various aircraft advance, a negative value of the Spacing indicates that the target aircraft will still be behind the ITP aircraft when it crosses the intermediate element Elt_int(k).

According to an alternative, the DAL– computer uses a temporal spacing defined by the expression:

Time_Spacing(m,k)=Traffic_Time(m,k)−Predicted_Time(k)

A negative value indicates that the target aircraft has passed the 3D crossing point (Predicted_Position(k), Alt_int(k)) before the ITP aircraft.

According to an alternative, and within the ITP framework, the DAL– computer computes the computation of the spacing in terms of altitude at the moment of longitudinal crossing according to the expression:

Alt_Spacing(m,k)=Alt_int(k)−Predicted_Alt(m,k)

A negative value indicates that the target aircraft has passed the 2D crossing point (Predicted_Position(k)), above the ITP aircraft.

Next, in a sixth step 314, the "conflict detection" function is implemented according to the first embodiment by the DAL– peripheral computer. The "conflict detection" function uses the following algorithm:
If ∥Spacing(m,k)∥<Tolerance_spacing then
Conflict detected=true
Else
Conflict detected=false
Endif
in which Tolerance_Spacing denotes a value managed by DAL–, arising from ATC recommendations (e.g. 20 NM i.e. 37 km between the 2 aircraft at the moment of crossing for ITP manoeuvres, and 2 NM/30 sec for FIM H manoeuvres).

According to an alternative, the values of Tolerance_spacing will be different according to the sign of "Spacing".

Indeed, it is preferable to cross behind the target aircraft. A smaller tolerance is possible in the case of a strictly positive Spacing.

According to an alternative, the conflict detection is performed according to a temporal criterion, or a vertical spacing criterion, according to analogous equations.

In the case where a conflict is detected, that is to say Conflict detected=true, at least one aircraft has too small a spacing during the crossing manoeuvre. In this case a seventh step 316 of selecting alternative navigation modes and/or elements is implemented by the DAL− peripheral computer according to the first embodiment. In the case where another "navigation element" is selected this involves a lower desired altitude in the context of vertical FIM manoeuvres for example, or a more distant "point of rejoining of the point merge" in the context of a horizontal FIM manoeuvre of HTMB type.

According to the first embodiment, the seventh step 316 seeks to preserve the desired element, and commands the DAL+ core computer to execute the third step 308 for a computation according to a different guidance mode.

In the case of vertical FIM manoeuvres of ITP type, the target aircraft (m,k) crosses the FIM aircraft in front, the method 302 commands a climb/descent mode with a greater resulting vertical speed, so that the aircraft (m,k) passes sufficiently far in front.

In an alternative, the method 302 commands a mode with a lower resulting vertical speed, so that the aircraft (m,k) passes sufficiently far (in the sense of the tolerance) behind.

In an alternative, the method gives priority to the vertical guidance mode, and proposes to reduce the desired altitude to the closest conflict-free flight level; the aircraft will then climb in several stages, repeating the manoeuvre a little later to attempt to rejoin the desired level.

In the case of FIM H horizontal FIM manoeuvres, if the target aircraft (m,k) crosses the FIM aircraft with too small a spacing, the method 302 commands a low longitudinal speed mode, so that the aircraft (m,k) passes sufficiently far in front.

In an alternative, the method proposes a higher heading deviation to lengthen the resulting lateral trajectory These considerations are valid for temporal and altitude spacings.

In the case where no conflict is detected, that is to say Conflict detected=false, an eighth step 318 of executing the manoeuvre is implemented by the DAL+ core computer according to the first embodiment. In this case the DAL+ core computer engages the Preferred_Guidance_Mode mode towards the desired navigation element. Since these are guidance manoeuvres, the DAL+ core computer (FMS or PA) is actually better adapted, in view of the criticality of the engagement (a higher risk of poor engagement by the existing DAL− computer).

A validation by the operator, that is to say the pilot, will be performed preferably before engagement.

By creating a system with two distinct development level computers, the invention makes it possible to minimize the cost criterion.

Advantageously, because only what is strictly required for the function is performed in the existing navigation computer, it is possible to steer the performance of the latter in terms of response time.

It also makes it possible to safeguard the upgradability of the mission computer (CPU/RAM/ROM) in order to be able to address other new functions.

The invention makes it possible to:
Guarantee the strictly minimum development level of the FIM function, while minimizing the development cost
Integrate the human factors into the cost criterion: cost of familiarization, training and failure management (maintenance)
decouple the upgrades of the two computers, and improve maintainability: The method allows the deployment of the various functions to be staggered over time without jeopardizing the key structuring elements of the systems, namely the "DAL+" computers.
make best use of the open architecture concepts that are beginning to be seen in "DAL+" computers such as for example the FMS.

The invention claimed is:

1. A method for functionally and physically integrating a new navigation service to be integrated into an avionics onboard system,
the avionics onboard system comprising:
a digital core computer DAL+, having a first criticality level DAL+, integrated into an initial architecture of peripheral computers and of databases having second safety criticality levels DAL−, lower than or equal to the first criticality level DAL+, and serving as a server by hosting a first plurality of generic open services Serv_DAL+(j), and
a peripheral computer DAL− for managing the new navigation service to be integrated, having a second criticality level DAL−, lower than or equal to the first criticality level DAL+, by dispatching service requests to the digital core computer DAL+ and/or to the peripheral computers and the databases of the initial architecture through a communications network;
wherein the method for functionally and physically integrating the new navigation service comprises the steps consisting in:
functionally decomposing the new navigation service into a second plurality of elementary functions FU(i),
determining, on a basis of the second plurality of the elementary functions FU(i), a first list of the elementary functions that can be executed in part or entirely by at least one generic open service, and for each elementary function a first sub-list of generic open service(s);
determining an optimal functional and physical distribution of the elementary functions FU(i) within the avionics onboard system over a set of possible distributions which minimizes a global cost criterion CG, dependent on several parameters, including at least an additional development cost of the elementary functions integrated within the digital DAL+ core computer and which guarantees a DAL level of an aircraft as a whole; and
carrying out the integration of the new navigation service by implementing the elementary functions and their scheduling according to the optimal functional and physical distribution determined within the onboard avionics system.

2. The method for functionally and physically integrating a new navigation service according to claim 1, wherein:
the optimal functional and physical distribution of the elementary functions FU(i) within the onboard avionics system over the set of possible distributions is determined so as to minimize a first global cost criterion CG1 which takes into account only the additional development cost of the elementary functions integrated within the digital DAL+ core computer; and the integration of the new navigation service is carried out by implementing the elementary functions and their scheduling according to the optimal functional and physical distribution determined within the onboard avionics system by using the first global cost criterion CG1.

3. The method for functionally and physically integrating a new navigation service according to claim 1, wherein:

the optimal functional and physical distribution of the elementary functions FU(i) within the onboard avionics system over the set of possible distributions is determined so as to minimize a second global cost criterion CG2 which also takes into account a development cost of communication interfaces between the DAL+ core computer and the peripheral computers, a cost in response time and a cost of maintainability so as to minimize communication exchanges; and the integration of the new client navigation service is carried out by implementing the elementary functions and their scheduling according to the optimal functional and physical distribution determined within the onboard avionics system by using the second global cost criterion CG2.

4. The method for functionally and physically integrating a new navigation service according to claim 2, wherein:

the optimal functional and physical distribution of the elementary functions FU(i) within the onboard avionics system over the set of possible distributions is determined so as to minimize a third global cost criterion CG3 which also takes into account a development of certain segments of code of low DAL level in the DAL+ core computer so as to minimize a complexity of the whole with a view to maintenance and evolution; and the integration of the new navigation service is carried out by implementing the elementary functions and their scheduling according to the optimal functional and physical distribution determined within the onboard avionics system by using the third global cost criterion CG3.

5. The method for functionally and physically integrating a new navigation service according to claim 1, wherein:

the optimal functional and physical distribution of the elementary functions FU(i) within the onboard avionics system over the set of possible distributions is determined so as to minimize a fourth global cost criterion CG4 which also takes into account use of DAL+ level code libraries in the peripheral computer of DAL− level so as to minimize the use of resources of the DAL+ core computer; and the integration of the new navigation service is carried out by implementing the elementary functions and their scheduling according to the optimal functional and physical distribution determined within the onboard avionics system by using the fourth global cost criterion CG4.

6. The method for functionally and physically integrating a new navigation service according to claim 1, further comprising an additional step, executed after having determined an optimal functional and physical distribution of the elementary functions FU(i) within the onboard avionics system, and consisting in:

performance of the new navigation service being verified and evaluated by emulation or simulation, and/or performance of the initial services implemented on the core computer and the peripheral computers being verified.

7. The method for functionally and physically integrating a new navigation service according to claim 1, wherein:

the new navigation service is a FIM navigation service for manoeuvres for a relative spacing between aircraft integrated functionally and physically into the onboard navigation system; and the FIM spacing manoeuvre is characterized by a succession of elementary functions FIM_FU(i); and the digital DAL+ core computer hosts services Serv_DAL+(j) for computing temporal predictions according to a specified guidance mode and which are used for the implementation of part of the elementary functions making up the spacing manoeuvre OPEN_FIM, and the digital DAL+ core computer is coupled to computers for piloting the aircraft.

8. The method for functionally and physically integrating a new navigation service according to claim 7, wherein the generic services Serv_DAL+(j) for computing temporal predictions according to a guidance mode comprises:

a first service Serv_DAL+(1) for temporal integration with a view to obtaining predictions according to a vertical guidance mode from among:

climb with fixed thrust and longitudinal speed setpoint (CAS, TAS, MACH or GS); mode termed 'Open Climb' in the conventional terminology;

climb with longitudinal speed setpoint and vertical speed setpoint (V/S); mode termed "CLIMB VS/SPEED" in the conventional terminology;

climb with longitudinal speed setpoint and slope setpoint (FPA); mode termed "CLIMB FPA/SPEED" in the conventional terminology;

descent modes (OPEN DES, VS, FPA, mirroring the climb modes); according to a horizontal guidance mode from among:

acquisition and Holding of heading (Heading mode),
acquisition and Holding of Course (Track or Course mode),
FMS trajectory tracking (LNAV Lateral Navigation mode),
radioelectric beam tracking (VOR, DME, LOC, etc.),
acquisition and Holding of lateral roll,
acquisition and Holding of attitude, or
acquisition and Holding of vertical attack angle, and a second service Serv_DAL+(2) for integrating the weather on various levels and in the lateral plane;

a third service Serv_DAL+(3) for selecting a particular configuration as input, a fourth service Serv_DAL+(4) for dispatching guidance setpoints of the service Serv_DAL+(1) to the automatic devices of the aircraft.

9. The method for functionally and physically integrating a new navigation service according to claim 7, wherein the FIM avionics method for the relative spacing manoeuvre comprises the following elementary functions:

a first elementary function FIM_FU(1) for selecting target navigation element and intermediate elements, a second elementary function FIM_FU(2) for selecting the guidance mode to rejoin the target element, a third elementary function FIM_FU(3) for computing the predictions giving a position and a time of transit of the FIM aircraft over the intermediate elements, a fourth elementary function FIM_FU(4) for forecasting the reference aeroplanes, at the instants corresponding to the time of transit, a fifth elementary function FIM_FU(5) for selecting a minimum spacing ITP to be complied with, a sixth function FIM_FU(6) for computing and displaying the spacing between the FIM aircraft and the reference aircraft over the intermediate elements, and a tenth elementary function FIM_FU(10) for executing the vertical manoeuvre.

10. The method for functionally and physically integrating a new navigation service according to claim 9, wherein the FIM avionics method for the relative spacing manoeuvres optionally comprises some of the following additional elementary functions:

a seventh elementary function FIM_FU(7) for detecting conflict, an eighth elementary function FIM_FU(8) for proposing a change of guidance mode, a ninth elementary function FIM_FU(9) for proposing a change of manoeuvre (vertical or lateral), an eleventh elementary function FIM_FU(11) for monitoring the spacing during the manoeuvre, a twelfth elementary function FIM_FU(12) for computing the weather profile over the FIM zone, at the various trajectory elements, so as to refine the predictions of the fourth elementary function FIM_FU(4), and a thirteenth elementary function FIM_FU(13) for modifying the aircraft state for computing the predictions of the fourth elementary function FIM_FU(4).

11. The method for functionally and physically integrating a new navigation service according to claim 9, wherein:

the optimal functional and physical distribution of the elementary functions FU(i) within the onboard avionics system over the set of possible distributions is determined so as to minimize a first global cost criterion CG1 which takes into account only the additional development cost of the elementary functions integrated within the digital DAL+ core computer; and the integration of the new navigation service is carried out by implementing the elementary functions and their scheduling according to the optimal functional and physical distribution determined within the onboard avionics system by using the first criterion CG1, wherein:

the following elementary functions are allocated to and implemented in the digital DAL+ core computer:

FIM_FU(4) which corresponds to its service Serv_DAL+(1) called for various intermediate elements, and FIM_FU(10) which corresponds to the service Serv_DAL+(4) for the selected guidance mode and the selected navigation element;

while the remaining elementary functions are allocated and implemented in the DAL− peripheral computer.

12. The method for functionally and physically integrating a new navigation service according to claim 9, wherein:

the optimal functional and physical distribution of the elementary functions FU(i) within the onboard avionics system over the set of possible distributions is determined so as to minimize a second global cost criterion CG2 which also takes into account the development cost of the communication interfaces between the DAL+ core computer and the peripheral computers, the cost in response time and the cost of maintainability so as to minimize the communication exchanges; and the integration of the new client navigation service is carried out by implementing the elementary functions and their scheduling according to the optimal functional and physical distribution determined within the onboard avionics system by using the second global criterion CG2, wherein:

the elementary function FIM_FU(10) which corresponds to the service Serv_DAL+(4) for the selected guidance mode and the selected navigation element is allocated to and implemented in the digital DAL+ core computer, while the elementary function FIM_FU(4) which corresponds functionally to its service Serv_DAL+(1) called for various intermediate elements is allocated and implemented in the DAL− peripheral computer.

13. The method for functionally and physically integrating a new navigation service according to claim 9, wherein:

the optimal functional and physical distribution of the elementary functions FU(i) within the onboard avionics system over the set of possible distributions is determined so as to minimize a first global cost criterion CG1 which takes into account only the additional development cost of the elementary functions integrated within the digital DAL+ core computer; and the integration of the new navigation service is carried out by implementing the elementary functions and their scheduling according to the optimal functional and physical distribution determined within the onboard avionics system by using the first criterion CG1, wherein:

the elementary functions FIM_FU(1), FIM_FU(2) and FIM_FU(10) are allocated to and implemented in the digital DAL+ core computer, only the function FIM_FU(10) corresponding to the use of an existing generic service Serv_DAL+(4) for the selected guidance mode and the selected navigation element, while the elementary function FIM_FU(4) which corresponds functionally to its service Serv_DAL+(1) called for various intermediate elements is allocated and implemented in the DAL− peripheral computer.

14. The method for functionally and physically integrating a new navigation service according to claim 9, wherein the first elementary step FIM_FU(1) comprises the steps consisting in:

selecting a desired flight level for a vertical manoeuvre, and/or selecting a manoeuvre start point as in particular a merge point for a lateral manoeuvre.

15. The method for functionally and physically integrating a new navigation service according to claim 9, wherein the second elementary step FIM_FU(2) comprises the steps consisting in:

selecting a vertical guidance mode for the vertical manoeuvre and a lateral guidance mode for the lateral manoeuvre, and selecting intermediate altitudes for the vertical manoeuvre and a lateral waypoint for the lateral manoeuvre.

16. The method for functionally and physically integrating a new navigation service according to claim 9, wherein the third elementary function FIM_FU(3) comprises the steps consisting in:

computing predictions of crossing time T for intermediate altitudes according to a selected vertical guidance mode, up to a desired altitude for an ITP manoeuvre; and/or computing predictions of crossing time T for intermediate positions according to a selected lateral guidance mode, up to the end of the lateral manoeuvre for an FIM H manoeuvre.

17. The method for functionally and physically integrating a new navigation service according to claim 9, wherein the fourth elementary function FIM_FU(4) comprises the steps consisting in:
forecasting traffic at the intermediate elements up to the instant T.

18. The method for functionally and physically integrating a new navigation service according to claim 9, wherein the sixth elementary function FIM_FU(6) comprises the steps consisting in:
computing the relative spacing in terms of position between a crossing prediction and a forecast of traffic, and
comparing it with respect to a fixed threshold in the fifth step FIM_FU(5).

19. An avionics onboard system configured to implement a new navigation service and to integrate it functionally and physically,
the avionics onboard system comprising:
a digital core computer DAL+, having a first criticality level DAL+, integrated into an initial architecture of peripheral computers and of databases having second criticality levels DAL−, lower than or equal to the first criticality level DAL+, and serving as server by hosting a first plurality of generic open services Serv_DAL+(j), and
a DAL− peripheral computer for managing the new navigation service, having a second criticality level DAL−, and serving as a client by dispatching service requests to the digital core computer DAL+ and/or to the peripheral computers and the databases of the initial architecture through a communications network,
the new navigation service being decomposed into a plurality of elementary functions FU(i) distributed physically between the digital core computer DAL+ and the peripheral management computer DAL− according to an optimal distribution scheme determined by the method of integration defined according to claim 1,
the peripheral management computer DAL− being configured to support an application from among:
a MMI,
an integrated MSI,
a CMU,
a TCAS,
a TAWS,
an EFB,
a tablet,
a TRAFFIC COMPUTER, or
a dedicated generic partition, and
the digital core computer DAL+ being configured to support an application from among:
a flight management system FMS,
an Automatic Pilot, or
an FMGS system combining the FMS and PA functions.

* * * * *